US006430020B1

(12) United States Patent
Atkins et al.

(10) Patent No.: US 6,430,020 B1
(45) Date of Patent: Aug. 6, 2002

(54) OVERVOLTAGE PROTECTION DEVICE INCLUDING WAFER OF VARISTOR MATERIAL

(75) Inventors: Ian Paul Atkins, Cary; Robert Michael Ballance, Raleigh; Jonathan Conrad Cornelius, Fuquay-Varina; Sherif I. Kamel, Apex; John Anthony Kizis, Fuquay-Varina; Clyde Benton Mabry, III, Greensboro, all of NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/520,275

(22) Filed: Mar. 7, 2000

Related U.S. Application Data

(63) Continuation-in-part of application No. 09/157,875, filed on Sep. 21, 1998, now Pat. No. 6,038,119.

(51) Int. Cl.[7] .................................................. H02H 1/00

(52) U.S. Cl. ....................................... 361/127; 361/118

(58) Field of Search ................ 361/117–119, 126–127, 361/56, 111, 91.1; 338/20, 21, 22 R

(56) References Cited

U.S. PATENT DOCUMENTS

| | | | | |
|---|---|---|---|---|
| 2,311,758 A | | 2/1943 | Johansson | |
| 4,015,228 A | | 3/1977 | Eda et al. | 337/28 |
| 4,092,694 A | | 5/1978 | Stetson | 361/126 |
| 4,240,124 A | | 12/1980 | Westrom | 361/27 |
| 4,241,374 A | | 12/1980 | Gilberts | 361/124 |
| 4,425,017 A | | 1/1984 | Chan | 339/96 |
| 4,493,003 A | * | 1/1985 | Mickelson et al. | 361/119 |
| 4,595,635 A | | 6/1986 | Dubrow et al. | 428/447 |
| 4,600,261 A | | 7/1986 | Debbaut | 339/116 C |
| 4,701,574 A | | 10/1987 | Shimirak et al. | 174/93 |

FOREIGN PATENT DOCUMENTS

| | | | |
|---|---|---|---|
| DE | 3428258 A1 | 2/1986 | H02G/3/18 |
| EP | 0 108 518 B1 | 5/1984 | H01R/4/70 |
| EP | 0 203 737 A2 | 12/1986 | C08J/3/24 |
| EP | 0 335 479 A2 | 10/1989 | |
| EP | 0 445 054 A1 | 9/1991 | |
| WO | WO 88/00603 | 1/1988 | C08L/53/02 |
| WO | WO 90/05401 | 5/1990 | H02G/15/18 |
| WO | WO 95/15600 | 6/1995 | H02G/15/013 |
| WO | WO 95/24756 | 9/1995 | H02G/15/013 |
| WO | WO 97/42693 | 11/1997 | H02G/15/013 |
| WO | WO 9838653 | 9/1998 | H01C/7/12 |

OTHER PUBLICATIONS

International Search Report, PCT/US01/06549, Jul. 12, 2001.

Data Book Library 1997, *Passive Components*, Siemens Matsushita Components, 1997, pp. 15–17, 26–32, 36–37, 39, 161, 166, 167, 169, 171–174. (No Month).

International Search Report for PCT/US99/21899 Dec. 29, 2000.

Written Opinion for PCT/US99/21899 Jun. 21, 2000.

(List continued on next page.)

*Primary Examiner*—Stephen W. Jackson
(74) *Attorney, Agent, or Firm*—Myers Bigel Sibley & Sajovec

(57) ABSTRACT

An overvoltage protection device includes a housing including a first substantially planar electrical contact surface and a sidewall. The housing defines a cavity therein and has an opening in communication with the cavity. An electrode member of the device includes a second substantially planar electrical contact surface facing the first electrical contact surface and disposed within the cavity. A portion of the electrode member extends out of the cavity and through the opening. A wafer formed of varistor material and having first and second opposed, substantially planar wafer surfaces is positioned within the cavity and between the first and second electrical contact surfaces with the first and second wafer surfaces engaging the first and second electrical contact surfaces, respectively.

38 Claims, 19 Drawing Sheets

U.S. PATENT DOCUMENTS

| | | | | |
|---|---|---|---|---|
| 5,172,296 | A | 12/1992 | Kaczmarek | 361/119 |
| 5,519,564 | A | 5/1996 | Carpenter | 361/127 |
| 5,529,508 | A | 6/1996 | Chiotis et al. | 439/204 |
| 5,588,856 | A | 12/1996 | Collins et al. | 439/204 |
| 5,652,690 | A | 7/1997 | Mansfield et al. | 361/127 |
| 5,721,664 | A | 2/1998 | Uken et al. | 361/125 |
| 5,808,850 | A | 9/1998 | Carpenter, Jr. | 361/127 |
| 5,936,824 | A | 8/1999 | Carpenter, Jr. | 361/126 |
| 6,038,119 | A | 3/2000 | Atkins et al. | 361/127 |

* cited by examiner

OVERVOLTAGE PROTECTION DEVICE INCLUDING WAFER OF VARISTOR MATERIAL

RELATED APPLICATIONS

This is a continuation-in-part application of U.S. application Ser. No. 09/157,875, filed Sep. 21, 1998, now U.S. Pat. No. 6,038,119.

FIELD OF THE INVENTION

The present invention relates to voltage surge protection devices and, more particularly, to a voltage surge protection device including a wafer of varistor material.

BACKGROUND OF THE INVENTION

Frequently, excessive voltage is applied across service lines which deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse may be blown or weakened by the essentially short circuit created by the shunt path.

Varistors have been constructed according to several designs for different applications. For heavy-duty applications (e.g., surge current capability in the range of from about 60 to 100 kA) such as protection of telecommunications facilities, block varistors are commonly employed. A block varistor typically includes a disk-shaped varistor element potted in a plastic housing. The varistor disk is formed by pressure casting a metal oxide material, such as zinc oxide, or other suitable material such as silicon carbide. Copper, or other electrically conductive material, is flame sprayed onto the opposed surfaces of the disk. Ring-shaped electrodes are bonded to the coated opposed surfaces and the disk and electrode assembly is enclosed within the plastic housing. Examples of such block varistors include Product No. SIOV-B860K250 available from Siemens Matsushita Components GmbH & Co. KG and Product No. V271BA60 available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

The varistor constructions described above often perform inadequately in service. Often, the varistors overheat and catch fire. Overheating may cause the electrodes to separate from the varistor disk, causing arcing and further fire hazard. There may be a tendency for pinholing of the varistor disk to occur, in turn causing the varistor to perform outside of its specified range. During high current impulses, varistor disks of the prior art may crack due to piezoelectric effect, thereby degrading performance. Failure of such varistors has led to new governmental regulations for minimum performance specifications. Manufacturers of varistors have found these new regulations difficult to meet.

SUMMARY OF THE INVENTION

In various embodiments, the present invention is directed to an overvoltage protection device which may provide a number of advantages for safely, durably and consistently handling extreme and repeated overvoltage conditions. The overvoltage protection device may include a wafer of varistor material and a pair of electrode members, one of which is preferably a housing, having substantially planar contact surfaces for engaging substantially planar surfaces of the wafer.

Preferably, the electrodes have relatively large thermal masses as compared to the thermal mass of the varistor wafer so as to absorb a significant amount of heat from the varistor wafer. In this manner, the device may reduce heat-induced destruction or degradation of the varistor wafer as well as any tendency for the varistor wafer to produce sparks or flame. The relatively large thermal masses of the electrodes and the substantial contact areas between the electrodes and the varistor wafer may also provide a more uniform temperature distribution in the varistor wafer, thereby potentially reducing hot spots and resultant localized depletion of the varistor material.

Preferably, the electrodes are mechanically loaded against the varistor wafer. Biasing means may be used to provide and maintain the load. The loading preferably provides a more even current distribution through the varistor wafer. As a result, the device may respond to overvoltage conditions more efficiently and predictably, and high current spots which may cause pinholing are more likely to be avoided. Also, the tendency for the varistor wafer to warp responsive to high current impulses may be prevented or reduced by the mechanical reinforcement provided by the electrodes. Moreover, during an overvoltage event, the device would be expected to provide lower inductance and lower resistance because of the more uniform and efficient current distribution through the varistor wafer.

Preferably, the device includes a metal housing and further components configured to prevent or minimize the expulsion of flame, sparks and/or varistor material upon overvoltage failure of the varistor wafer. The wafer may be formed by slicing the wafer from a rod of the varistor material.

In further embodiments of the present invention, an overvoltage protection device includes a housing including a first substantially planar electrical contact surface and an electrically conductive sidewall. The housing defines a cavity therein and has an opening in communication with the cavity. An electrode member of the device may include a second substantially planar electrical contact surface facing the first electrical contact surface and disposed within the cavity. A portion of the electrode member may extend out of the cavity and through the opening. A wafer formed of varistor material and having first and second opposed, substantially planar wafer surfaces is positioned within the cavity and between the first and second electrical contact surfaces with the first and second wafer surfaces engaging the first and second electrical contact surfaces, respectively.

According to further embodiments of the present invention, an overvoltage protection device for use with a varistor wafer of the type having first and second opposed, substantially planar wafer surfaces includes a housing including a first substantially planar electrical contact surface and an electrically conductive sidewall. The housing defines a cavity therein and has an opening in communication with the cavity. An electrode member of the device may include a second substantially planar electrical contact surface facing the first contact surface and disposed within the cavity. A portion of the electrode may extend out of the cavity and through the opening. The housing and the electrode member may be relatively arranged and configured to receive the wafer within the cavity such that the wafer is positioned between the first and second electrical contact surfaces with the first and second electrical contact surfaces engaging the first and second wafer surfaces, respectively.

In other embodiments of the present invention, an overvoltage protection device for use with a varistor wafer of the type having first and second opposed, substantially planar wafer surfaces includes a housing defining a cavity therein and having an opening in communication with the cavity. The housing includes a sidewall and a bottom wall including a first substantially planar electrical contact surface and an adjacent recessed surface. The first electrical contact surface defines a raised platform relative to the recessed surface. An electrode member of the device may include a second substantially planar electrical contact surface facing the first contact surface and disposed within the cavity. A portion of the electrode may extend out of the cavity and through the opening. The housing and the electrode member may be relatively arranged and configured to receive the wafer within the cavity such that the wafer is positioned between the first and second electrical contact surfaces with the first and second electrical contact surfaces engaging the first and second wafer surfaces, respectively, and such that the wafer does not engage the recessed surface.

According to further embodiments of the present invention, an overvoltage protection device for use with a varistor wafer of the type having first and second opposed, substantially planar wafer surfaces includes a housing including a first substantially planar electrical contact surface and a sidewall. The housing defines a cavity therein and has an opening in communication with the cavity. An electrode member of the device may include a second substantially planar electrical contact surface facing the first contact surface and disposed within the cavity and a shaft extending out of the cavity and through the opening. The shaft may include a circumferential shaft groove formed therein. A closure member may be interposed between the second electrical contact surface and the opening. The closure member may have a hole defined therein. A resilient O-ring may be disposed in the shaft groove. The shaft may extend through the aperture, the O-ring may be disposed in the hole and the O-ring may be positioned to provide a seal between the shaft and the closure member. The housing and the electrode member may be relatively arranged and configured to receive the wafer within the cavity such that the wafer is positioned between the first and second electrical contact surfaces with the first and second electrical contact surfaces engaging the first and second wafer surfaces, respectively.

According to further embodiments of the present invention, an overvoltage protection device for use with a varistor wafer of the type having first and second opposed, substantially planar wafer surfaces includes a housing including a first substantially planar electrical contact surface and a sidewall. The housing defines a cavity therein and has an opening in communication with the cavity. An electrode member of the device may include a second substantially planar electrical contact surface facing the first contact surface and disposed within the cavity. A portion of the electrode may extend out of the cavity and through the opening. A closure member may be interposed between the second electrical contact surface and the opening. The closure member may have a peripheral groove formed therein. A resilient O-ring may be disposed in the peripheral groove. The O-ring may be positioned to provide a seal between the closure member and the sidewall of the housing. The housing and the electrode member may be relatively arranged and configured to receive the wafer within the cavity such that the wafer is positioned between the first and second electrical contact surfaces with the first and second electrical contact surfaces engaging the first and second wafer surfaces, respectively.

According to other embodiments of the invention, an overvoltage protection device for use with a varistor wafer of the type having first and second opposed, substantially planar wafer surfaces includes a housing including a first substantially planar electrical contact surface and a sidewall. The housing defines a cavity therein and has an opening in communication with the cavity. An electrode member of the device may include a second substantially planar electrical contact surface facing the first contact surface and disposed within the cavity. A portion of the electrode may extend out of the cavity and through the opening. An end cap may be positioned in the opening. A clip may be positioned to limit displacement between the end cap and the housing. The housing and the electrode member may be relatively arranged and configured to receive the wafer within the cavity such that the wafer is positioned between the first and second electrical contact surfaces with the first and second electrical contact surfaces engaging the first and second wafer surfaces, respectively.

According to further embodiments of the present invention, a method of installing a truncated ring-shaped clip in a housing, the clip having a pair of opposed end portions each having an aperture formed therein, includes compressing the clip using the apertures. The clip is positioned relative to the housing. The clip is released to allow the clip to engage the housing. Thereafter, the end portions of the clip may be cut.

According to further embodiments of the present invention, a method of installing a truncated ring-shaped clip in a housing, the clip having a pair of opposed end portions each having an aperture formed therein, includes compressing the clip using the apertures. The clip is positioned relative to the housing. The clip is released to allow the clip to engage the housing. Thereafter, a filler material may be placed into each of the apertures.

According to other embodiments of the present invention, an overvoltage protection device for use with a varistor wafer of the type having first and second opposed, substantially planar wafer surfaces includes a housing including a first substantially planar electrical contact surface and a sidewall. The housing defines a cavity therein and has an opening in communication with the cavity. An electrode member of the device may include a second substantially planar electrical contact surface facing the first contact surface and disposed within the cavity. A portion of the electrode may extend out of the cavity and through the opening. First and second Belleville washers may bias at least one of the first and second contact surfaces toward the other. Each of the washers may be tapered along an axis thereof. The first and second Belleville washers are preferably axially aligned and oppositely oriented. The housing and the electrode member may be relatively arranged and configured to receive the wafer within the cavity such that the wafer is positioned between the first and second electrical contact surfaces with the first and second electrical contact surfaces engaging the first and second wafer surfaces, respectively.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

The accompanying drawings which form a part of the specification, illustrate key embodiments of the present invention. The drawings and description together serve to fully explain the invention. In the drawings.

DETAILED DESCRIPTION OF THE PREFERRED EMBODIMENTS

Figure 1:
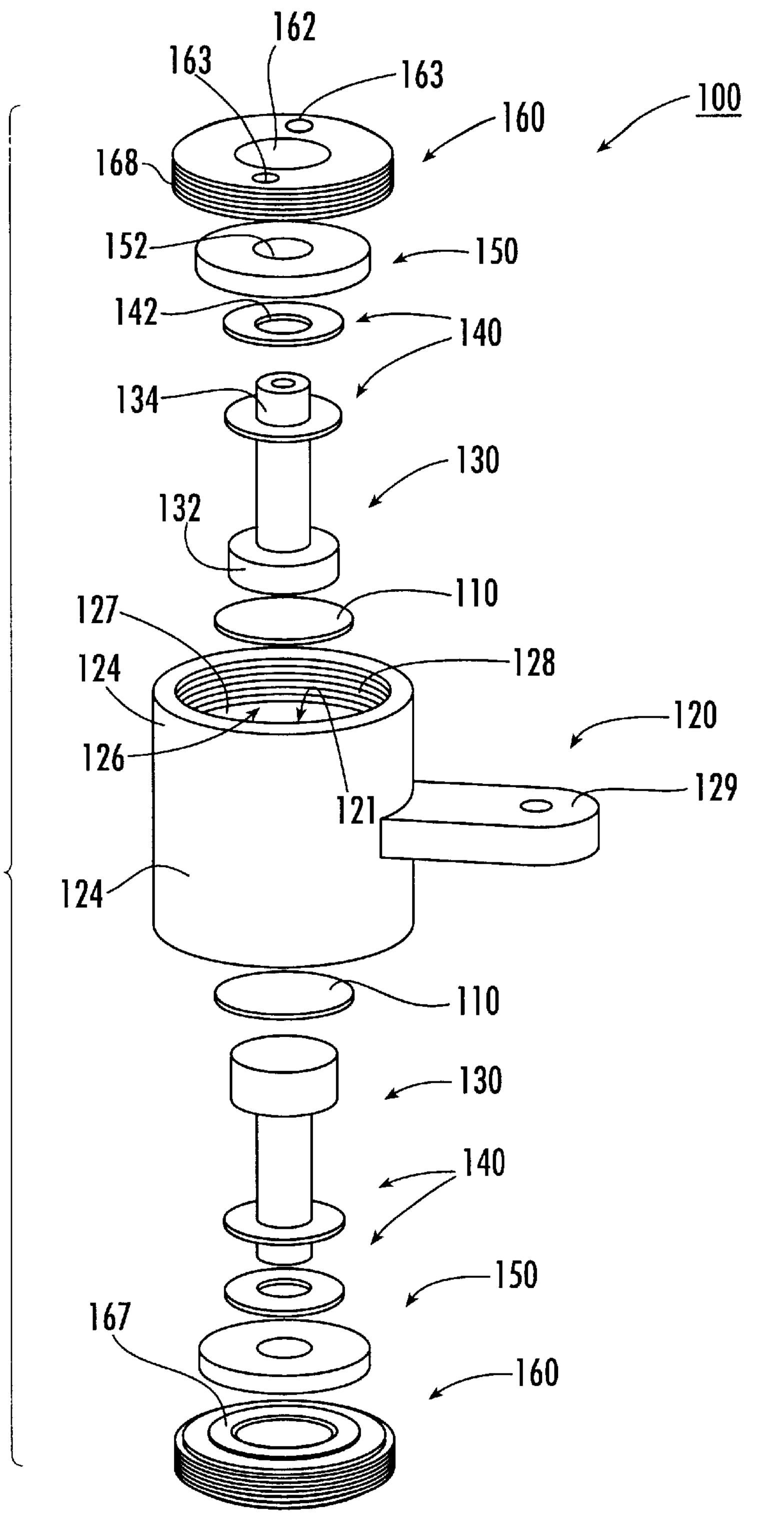
FIG. 1 is an exploded, perspective view of a varistor device according to the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. The terms "upwardly", "downwardly", "vertical", "horizontal" and the like are used herein for the purpose of explanation only.

Figure 2:
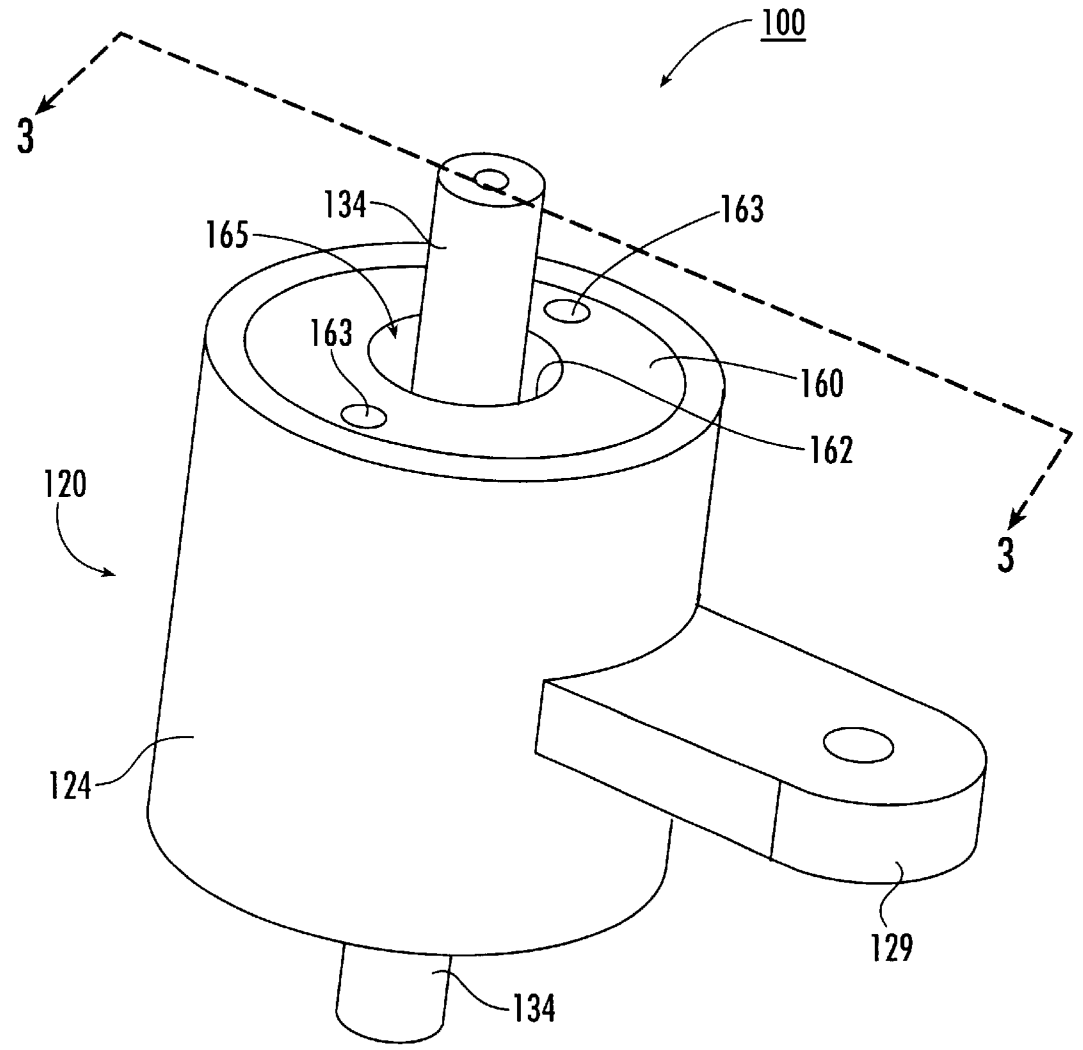
FIG. 2 is a top perspective view of the varistor device of FIG. 1.
Figure 3:
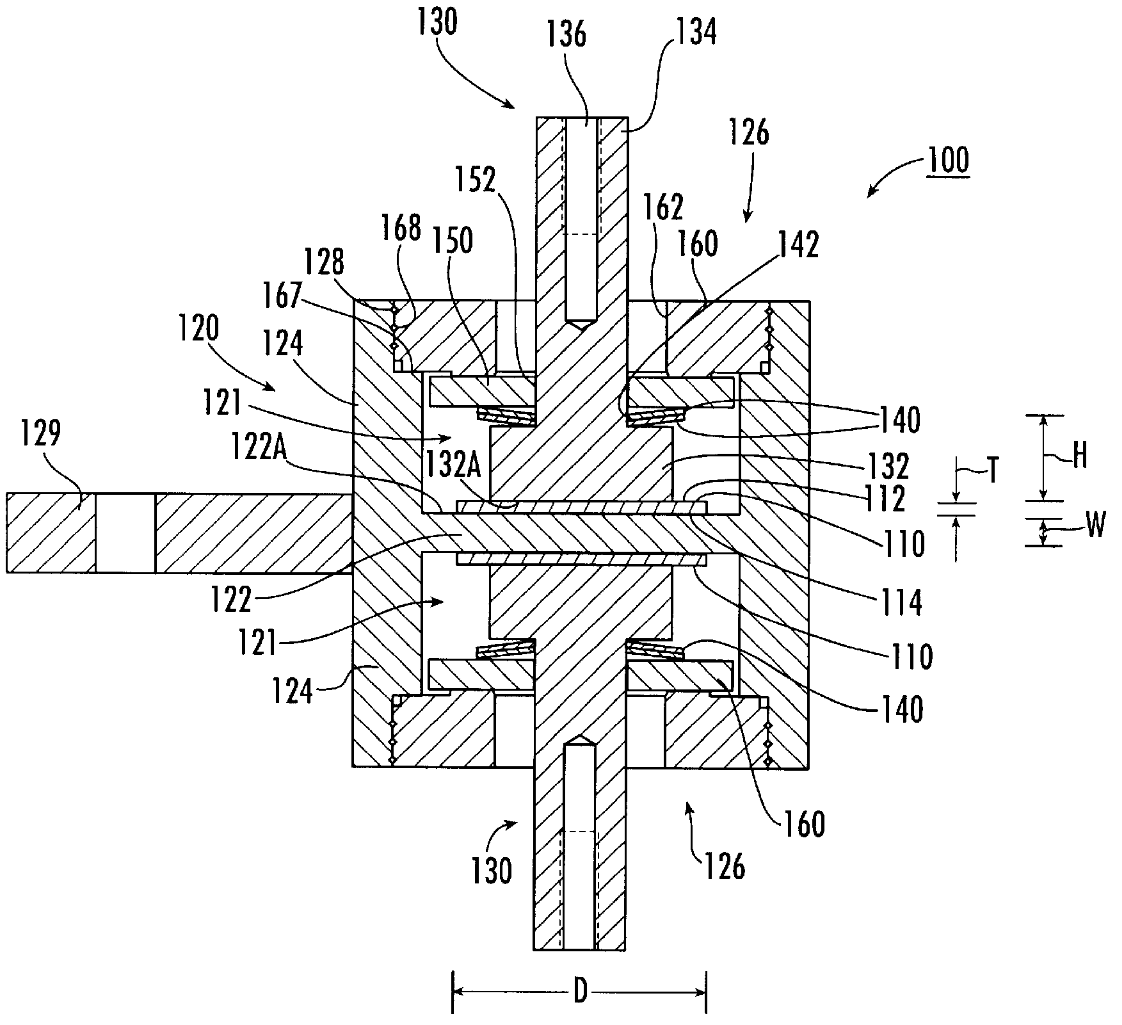
FIG. 3 is a cross-sectional view of the varistor device of FIG. 1 taken along the line 3—3 of FIG. 2.

With reference to FIGS. 1–3, an overvoltage protection device according to a first embodiment of the present invention is shown therein and designated 100. The device 100 includes a housing 120 of generally cylindrical shape. The housing is preferably formed of aluminum. However, any suitable conductive metal may be used. The housing has a center wall 122 (FIG. 3), cylindrical walls 124 extending from the center wall in opposite directions, and a housing electrode ear 129 extending outwardly from the walls 124. The housing is preferably unitary and axially symmetric as shown. The cylindrical walls 124 and the center wall 122 form cavities 121 on either side of the center wall, each cavity communicating with a respective opening 126.

A piston-shaped electrode 130 is positioned in each of the cavities 121. Shafts 134 of the electrodes 130 project outwardly through the respective openings 126. The electrodes 130 are preferably formed of aluminum. However, any suitable conductive metal may be used. Additionally, and as discussed in greater detail below, a varistor wafer 110, spring washers 140, an insulator ring 150 and an end cap 160 are disposed in each cavity 121.

In use, the device 100 may be connected directly across an AC or DC input, for example, in an electrical service a utility box. Service lines are connected directly or indirectly to the electrode shafts 134 and the housing electrode ear 129 such that an electrical flow path is provided through the electrodes 130, the varistor wafers 110, the housing center wall 122 and the housing electrode ear 129. In the absence of an overvoltage condition, the varistor wafers 110 provide high resistances such that no current flows through the device 100 as it appears electrically as an open circuit. In the event of an overvoltage condition (relative to the design voltage of the device), the resistances of the varistor wafers decrease rapidly, allowing current to flow through the device 100 and create a shunt path for current flow to protect other components of an associated electrical system. The general use and application of overvoltage protectors such as varistors is well known to those of skill in the art and, accordingly, will not be further detailed herein.

As will be appreciated from the Figures, the device 100 is axially symmetric, the upper and lower halves of the device 100 being constructed in the same manner. Accordingly, the device 100 will be described hereinafter with respect to the upper portion only, it being understood that such description applies equally to the lower portion.

Turning to the construction of the device 100 in greater detail, the electrode 130 has a head 132 and an integrally formed shaft 134. As best seen in FIG. 3, the head 132 has a substantially planar contact surface 132A which faces a substantially planar contact surface 122A of the housing center wall 122. The varistor wafer 110 is interposed between the contact surfaces 122 and 132. As described in more detail below, the head 132 and the center wall 122 are mechanically loaded against the varistor wafer 110 to ensure firm and uniform engagement between the surfaces 112 and 132A and between the surfaces 114 and 122A. A threaded bore 136 is formed in the end of the shaft 134 to receive a bolt for securing a bus bar or other electrical connector to the electrode 130.

Figure 4:
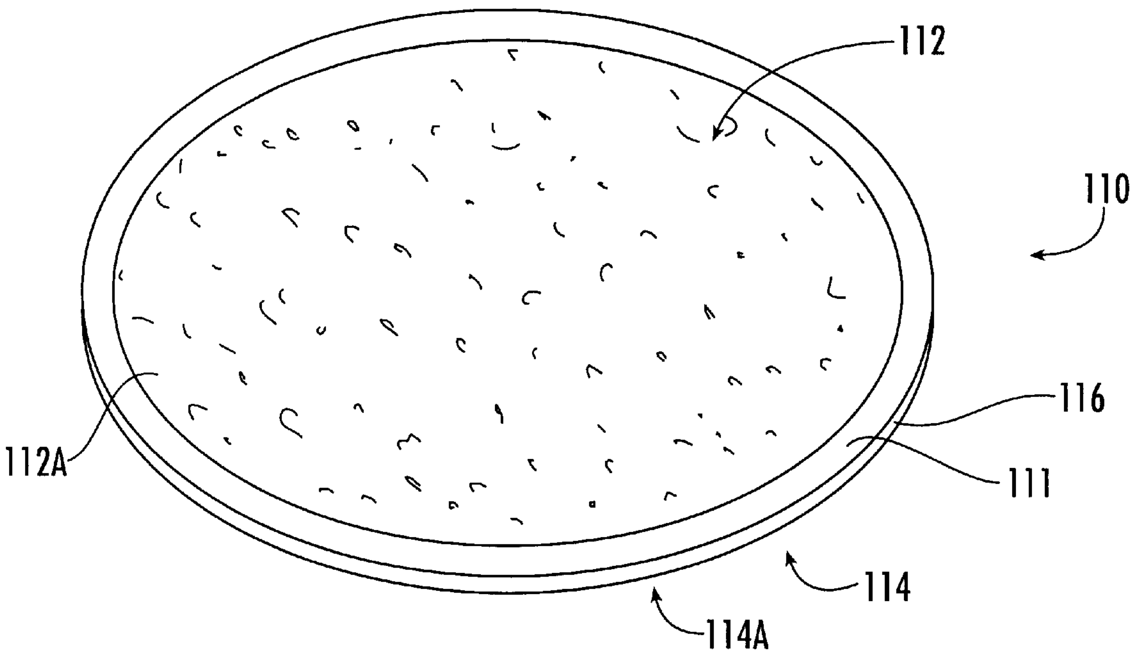
FIG. 4 is a perspective view of a varistor wafer.
Figure 5:
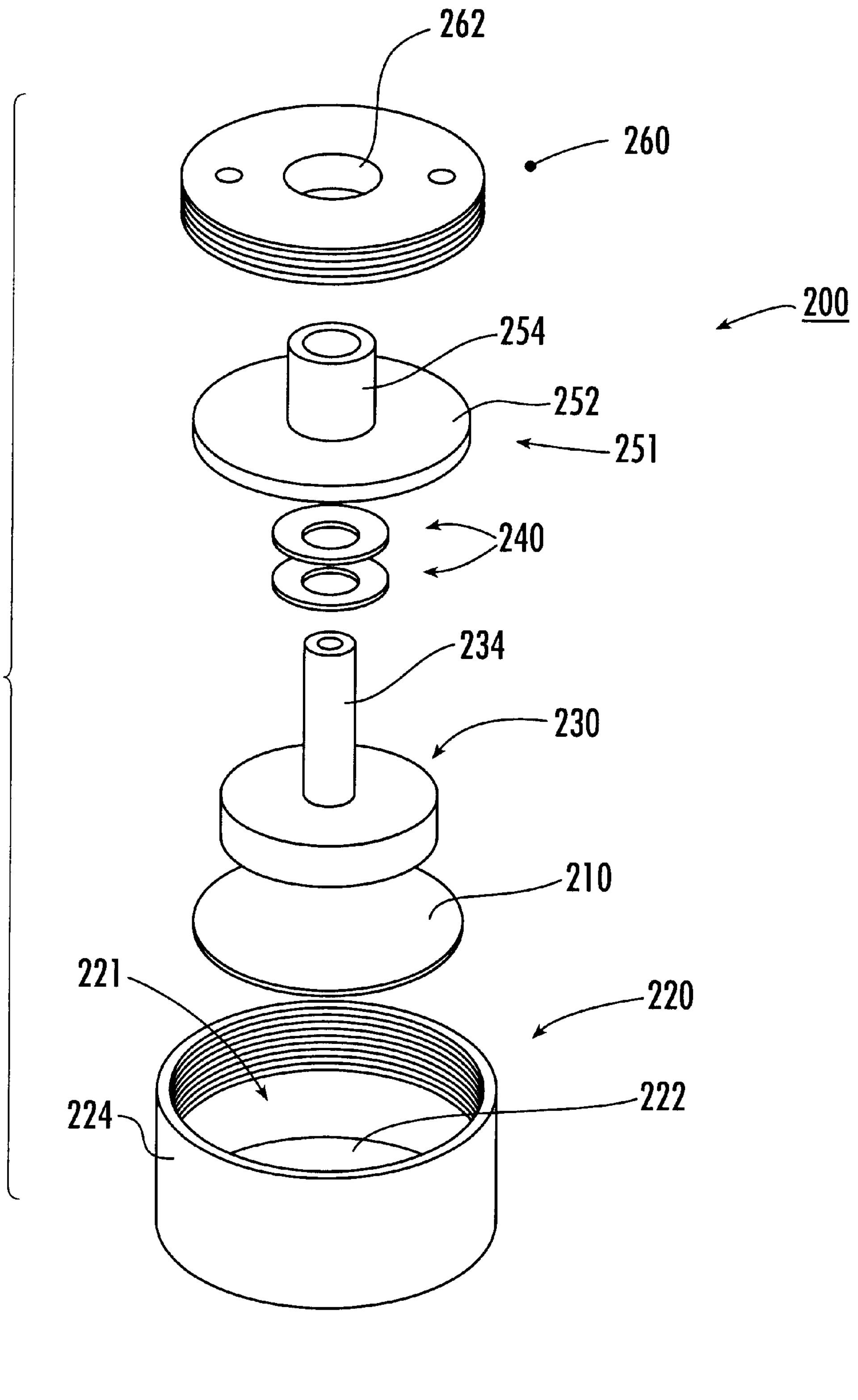
FIG. 5 is an exploded, perspective view of a varistor device according to a second embodiment of the present invention.
Figure 6:
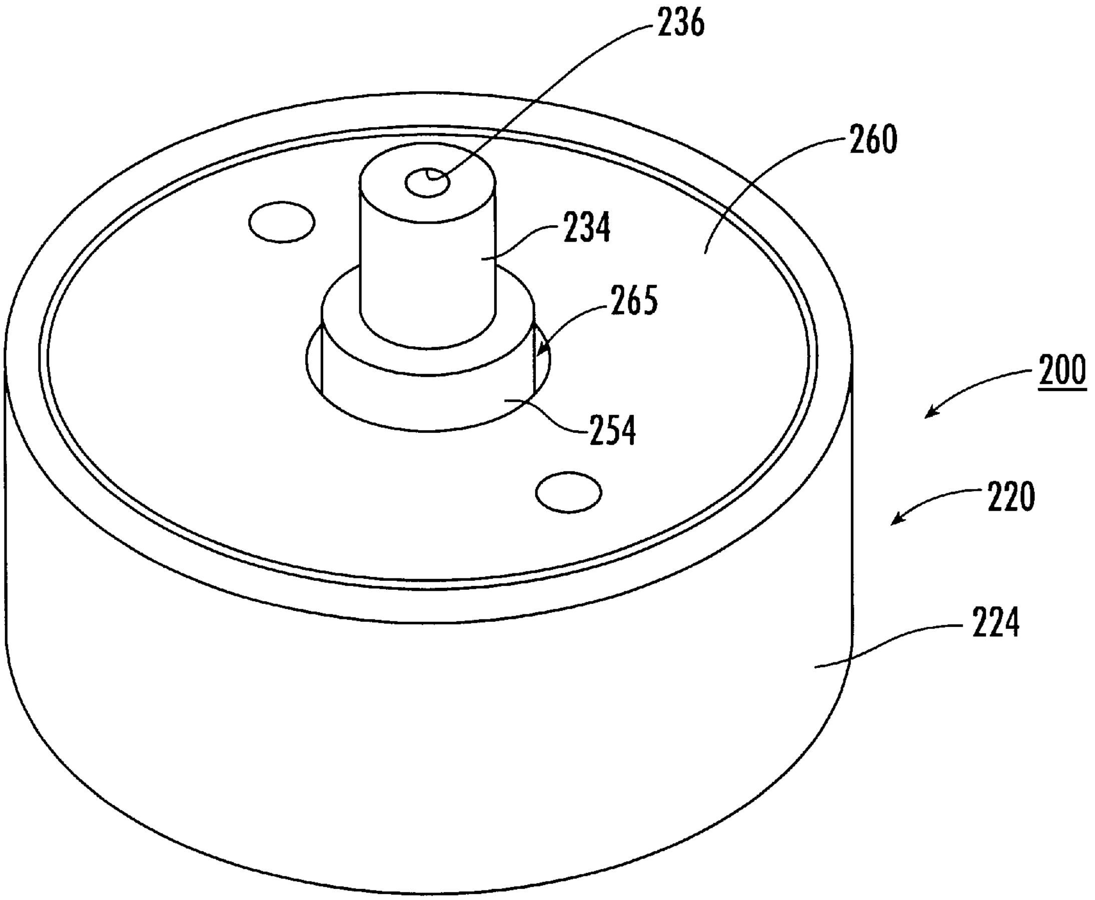
FIG. 6 is a top perspective view of the varistor device of FIG. 5.
Figure 7:
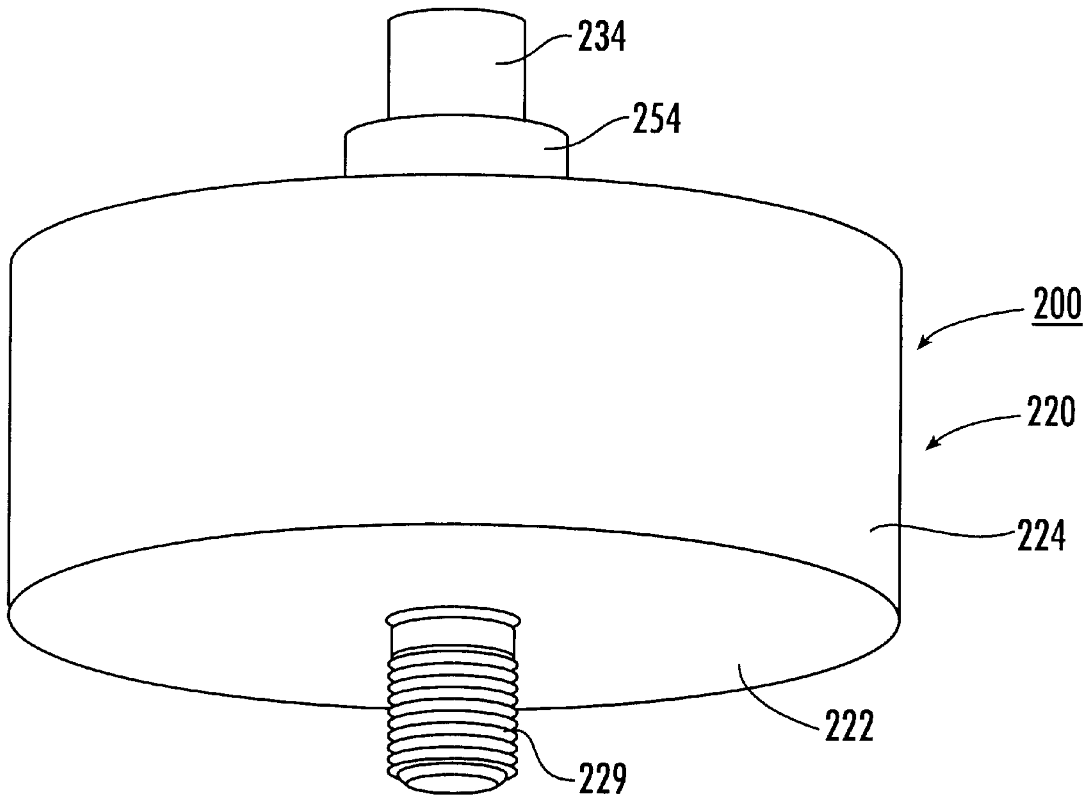
FIG. 7 is a bottom perspective view of the varistor device of FIG. 5.

With reference to FIG. 4, the varistor wafer 110 has a first substantially planar contact surface 112 and a second, opposed, substantially planar contact surface 114. As used herein, the term "wafer" means a substrate having a thickness which is relatively small compared to its diameter, length or width dimensions. The varistor wafer 110 is preferably disk-shaped. However, the varistor wafer may be formed in other shapes. The thickness T and the diameter D of the varistor 110 will depend on the varistor characteristics desired for the particular application. Preferably, and as shown, the varistor wafer 110 includes a wafer 111 of varistor material coated on either side with a conductive coating 112A, 114A, so that the exposed surfaces of the coatings 112A and 114A serve as the contact surfaces 112 and 114. Preferably, the coatings 112A, 114A are formed of aluminum, copper or solder.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The varistor material wafer 111 is preferably formed by first forming a rod or block(not shown) of the varistor material and then slicing the wafer 111 from the rod using a diamond cutter or other suitable device. The rod may be formed by extruding or casting a rod of the varistor material and thereafter sintering the rod at high temperature in an oxygenated environment. This method of forming allows for the formation of a wafer having more planar surfaces and less warpage or profile fluctuation than would typically be obtained using a casting process. The coatings 112A, 114A are preferably formed of aluminum or copper and may be flame sprayed onto the opposed sides of the wafer 111.

While the device 100 as shown in FIG. 1 includes two spring washers 140, more or fewer may be used. Each spring washer 140 includes a hole 142 which receives the shaft 134 of the electrode 130. Each spring washer 140 surrounds a portion of the shaft 134 immediately adjacent to the head 132 and abuts the rear face of the head 132 or the preceding spring washer 140. Each hole 142 preferably has a diameter of between about 0.012 and 0.015 inch greater than the corresponding diameter of the shaft 134. The spring washers 140 are preferably formed of a resilient material and, more preferably, the spring washers 140 are Belleville washers formed of spring steel.

The insulator ring 150 overlies and abuts the outermost spring washer 140. The insulator ring 150 has a hole 152 formed therein which receives the shaft 134. Preferably, the diameter of the hole 152 is between about 0.005 and 0.007 inch greater than the corresponding diameter of the shaft 134. The insulator ring 150 is preferably formed of an electrically insulating material having high melting and combustion temperatures. More preferably, the insulator ring 150 is formed of polycarbonate, ceramic or a high temperature polymer.

The end cap 160 overlies and abuts the insulator ring 150. The end cap 160 has a hole 162 which receives the shaft 134. Preferably, the diameter of the hole 162 is between about 0.500 and 0.505 inch greater than the corresponding diameter of the shaft 134 to provide a sufficient clearance gap 165 (FIG. 2) to avoid electrical arcing between the end cap 160 and the electrode shaft 134 during non-overvoltage conditions. Threads 168 on the peripheral wall of the end cap 160 engage complementary threads 128 formed in the housing 120. Holes 163 are formed in the end cap to receive a tool (not shown) for rotating the end cap 160 with respect to the housing 120. Other means for receiving a tool, for example, a hex-shaped slot, may be provided in place of or in addition to the holes 163. The end cap 160 has an annular ridge 167 which is received within the inner diameter of the housing 120. The housing 120 includes a rim 127 to prevent over-insertion of the end cap 150. Preferably, the end cap is formed of aluminum.

As noted above and as best shown in FIG. 3, the electrode head 132 and the center wall 122 are loaded against the varistor wafer 110 to ensure firm and uniform engagement between the surfaces 112 and 132A and between the surfaces 114 and 122A. This aspect of the device 100 may be appreciated by considering a method according to the present invention for assembling the device 100. The varistor wafer 110 is placed in the cavity 121 such that the wafer surface 114 engages the contact surface 122A. The electrode 130 is inserted into the cavity 121 such that the contact surface 132A engages the varistor wafer surface 112. The spring washers 140 are slid down the shaft 134 and placed over the head 132. The insulator ring 150 is slid down the shaft 134 and over the outermost spring washer 140. The end cap 160 is slid down the shaft 134 and screwed into the opening 126 by engaging the threads 168 with the threads 128 and rotating.

Once the device 100 has been assembled as just described, the end cap 160 is selectively torqued to force the insulator ring 150 downwardly so that it partially deflects the spring washers 140. The loading of the end cap 160 onto the insulator ring 150 and from the insulator ring onto the spring washers 140 is in turn transferred to the head 132. In this way, the varistor wafer 110 is sandwiched (clamped) between the head 132 and the center wall 122.

Preferably, the device 100 is designed such that the desired loading will be achieved when the spring washers 150 are only partially deflected and, more preferably, when the spring washers are fifty percent (50%) deflected. In this way, variations in manufacturing tolerances of the other components of the device 100 may be accommodated.

The amount of torque applied to the end cap 160 will depend on the desired amount of load between the varistor wafer 110 and the head 132 and the center wall 122. Preferably, the amount of the load of the head and the center wall against the varistor wafer is at least 264 lbs. More preferably, the load is between about 528 and 1056 lbs. Preferably, the coatings 112A and 114A have a rough initial profile and the compressive force of the loading deforms the coatings to provide more continuous engagements between the coatings and the contact surfaces 122A and 132A.

Alternatively, or additionally, the desired load amount may be obtained by selecting an appropriate number and or sizes of spring washers 140. The spring washers each require a prescribed amount of load to deflect a prescribed amount and the overall load will be the sum of the spring deflection loads.

Preferably, the area of engagement between the contact surface 132A and the varistor wafer surface 112 is at least 1.46 square inches. Likewise, the area of engagement between the contact surface 122A and the varistor wafer surface 114 is preferably at least 1.46 square inches. Preferably, the electrode head 132 has a thickness H of at least 0.50 inch. The center wall 122 preferably has a thickness W of at least 0.25 inch.

The combined thermal mass of the housing 120 and the electrode 130 should be substantially greater than the thermal mass of the varistor wafer 110. As used herein, the term "thermal mass" means the product of the specific heat of the material or materials of the object (e.g., the varistor wafer 110) multiplied by the mass or masses of the material or materials of the object. That is, the thermal mass is the quantity of energy required to raise one gram of the material or materials of the object by one degree centigrade times the mass or masses of the material or materials in the object. Preferably, the thermal masses of each of the electrode head 132 and the center wall 122 are substantially greater than the thermal mass of the varistor wafer 110. Preferably, the thermal masses of each of the electrode head 132 and the center wall 122 are at least two (2) times the thermal mass of the varistor wafer 110, and, more preferably, at least ten (10) times as great.

The overvoltage protection device 100 provides a number of advantages for safely, durably and consistently handling extreme and repeated overvoltage conditions. The relatively large thermal masses of the housing 120 and the electrode 130 serve to absorb a relatively large amount of heat from the varistor wafer 110, thereby reducing heat induced destruction or degradation of the varistor wafer as well as reducing any tendency for the varistor wafer to produce sparks or flame. The relatively large thermal masses and the substantial contact areas between the electrode and the housing and the varistor wafer provide a more uniform temperature distribution in the varistor wafer, thereby minimizing hot spots and resultant localized depletion of the varistor material.

The loading of the electrode and the housing against the varistor wafer as well as the relatively large contact areas provide a more even current distribution through the varistor wafer 10. As a result, the device 100 responds to overvoltage conditions more efficiently and predictably, and high current spots which may cause pinholing are more likely to be avoided. The tendency for the varistor wafer 110 to warp responsive to high current impulses is reduced by the mechanical reinforcement provided by the loaded head 132 and center wall 122. The spring washers may temporarily deflect when the varistor wafer expands and return when the varistor wafer again contracts, thereby maintaining the load throughout and between multiple overvoltage events. Moreover, during an overvoltage event, the device 100 will generally provide lower inductance and lower resistance because of the more uniform and efficient current distribution through the varistor wafer.

The device 100 also serves to prevent or minimize the expulsion of flame, sparks and/or varistor material upon overvoltage failure of the varistor wafer 110. The strength of the metal housing as well as the configuration of the electrode 130, the insulator ring 150 and the end cap 160 serve to contain the products of a varistor wafer failure. In the event that the varistor destruction is so severe as to force the electrode 130 away from the varistor and melt the insulator ring 150, the electrode 130 will be displaced into direct contact with the end cap 160, thereby shorting the electrode 130 and the housing 120 and causing an in-line fuse (not shown) to blow.

While the housing 120 is illustrated as cylindrically shaped, the housing may be shaped differently. The lower half of the device 100 may be deleted, so that the device 100 includes only an upper housing wall 124 and a single varistor wafer, electrode, spring washer or set of spring washers, insulator ring and end cap.

Methods for forming the several components of the device will be apparent to those of skill in the art in view of the foregoing description. For example, the housing 120, the electrode 130, and the end cap 160 may be formed by machining, casting or impact molding. Each of these elements may be unitarily formed or formed of multiple components fixedly joined, by welding, for example.

With reference to FIGS. 5–8, a varistor device 200 according to a second embodiment of the present invention is shown therein. The varistor device 200 includes elements 210, 230, 240 and 260 corresponding to elements 110, 130, 140 and 160, respectively, of the varistor device 100. The varistor device 200 differs from the varistor device 100 in that the device 200 includes only a single varistor wafer 210 and corresponding components. The varistor device 200 includes a housing 220 which is the same as the housing 120 except as follows. The housing 220 defines only a single cavity 221, and has only a single surrounding wall 224 extending from the center (or end) wall 222 thereof. Also, the housing 220 has a threaded stud 229 (FIG. 7) extending from the lower surface of the center (or end) wall 222 rather than a sidewardly extending electrode ear corresponding to the electrode ear 129. The stud 229 is adapted to engage a threaded bore of a conventional electrical service utility box or the like.

The varistor device 200 further differs from the varistor device 100 in the provision of an insulator ring 251. The insulator ring 251 has a main body ring 252 corresponding to the insulator ring 150. The ring 251 further includes a collar 254 extending upwardly from the main body ring 252. The inner diameter of the collar 254 is sized to receive the shaft 234 of the electrode 230, preferably in clearance fit. The outer diameter of the collar 254 is sized to pass through the hole 262 of the end cap 260 with a prescribed clearance gap 265 (FIG. 6) surrounding the collar 254. The gap 265 allows clearance for inserting the shaft 134 and may be omitted. The main body ring 252 and the collar 254 are preferably formed of the same material as the insulator ring 150. The main body ring 252 and the collar 254 may be bonded or integrally molded.

Figure 8:
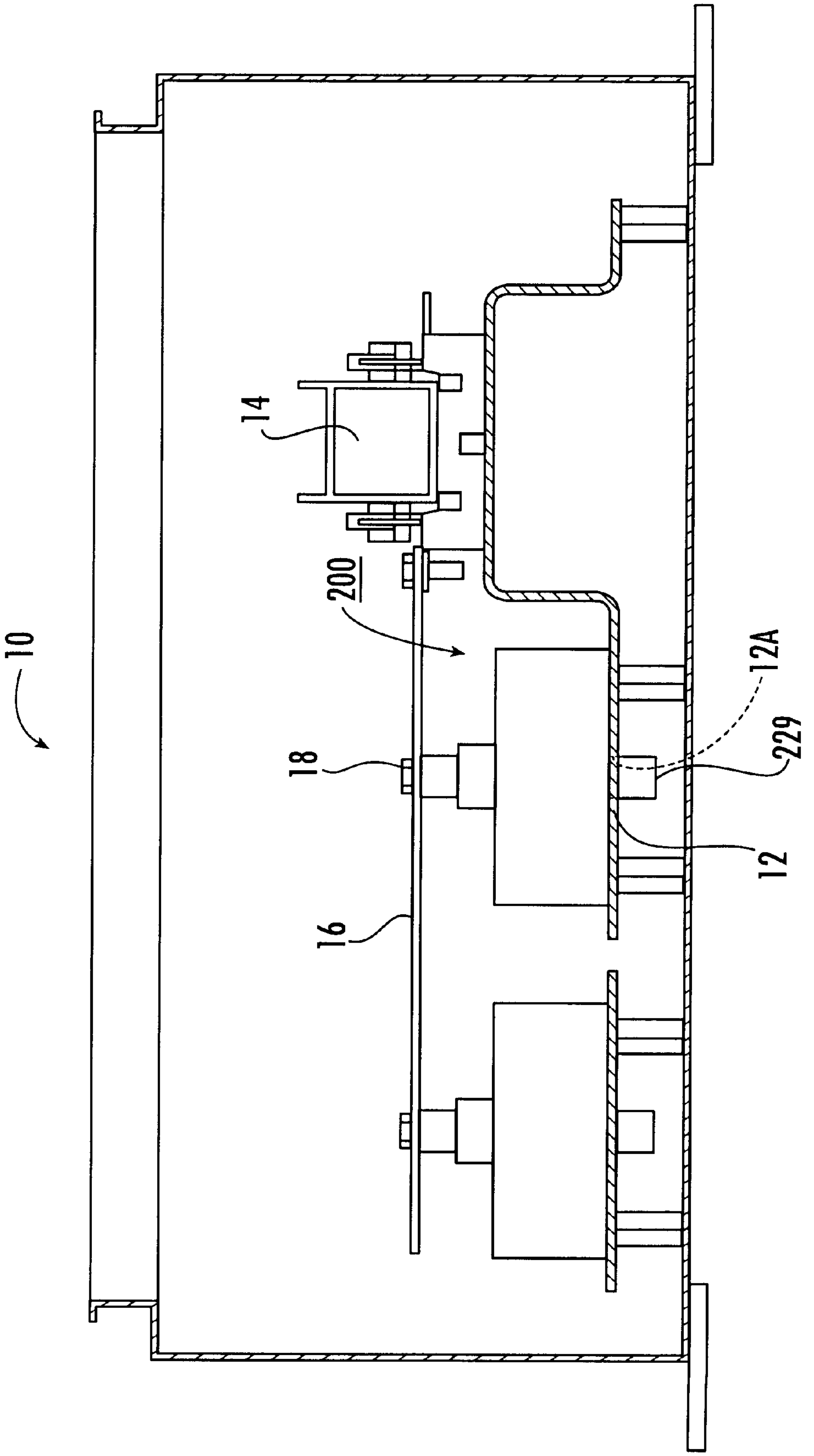
FIG. 8 is a view of the varistor device of FIG. 5, in which the varistor device is mounted in an electrical service utility box.

With reference to FIG. 8, the varistor device 200 is shown therein mounted in an electrical service utility box 10. The varistor device 200 is mounted on a metal platform 12 electrically connected to earth ground. The electrode stud 229 engages and extends through a threaded bore 12A in the platform 12. A bus bar 16, electrically connected a first end of a fuse 14, is secured to the electrode shaft 234 by a threaded bolt 18 inserted into the threaded bore 236 of the electrode 230. A second end of the fuse may be connected to an electrical service line or the like. As shown in FIG. 8, a plurality of varistor devices 200 may be connected in parallel in a utility box 10.

Figure 9:
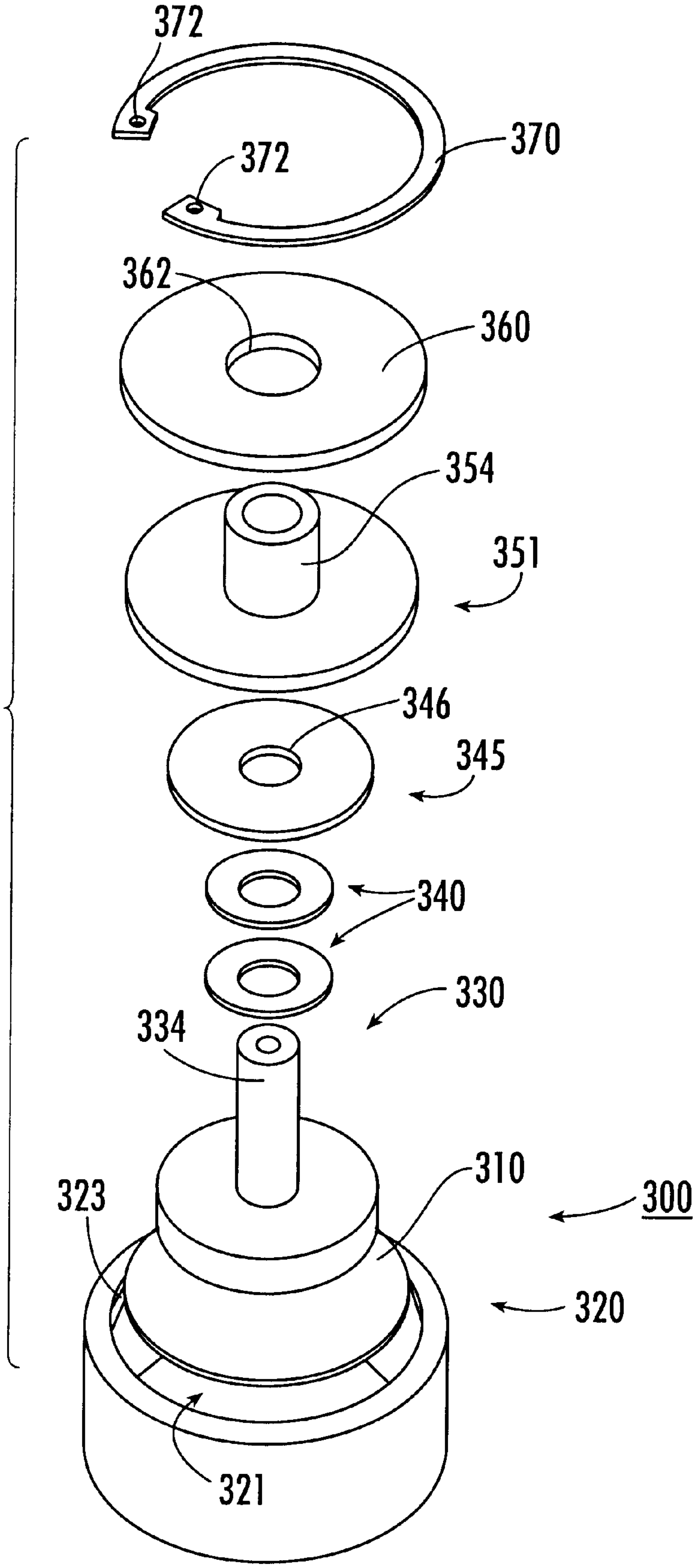
FIG. 9 is an exploded, perspective view of a varistor device according to a third embodiment of the present invention.
Figure 10:
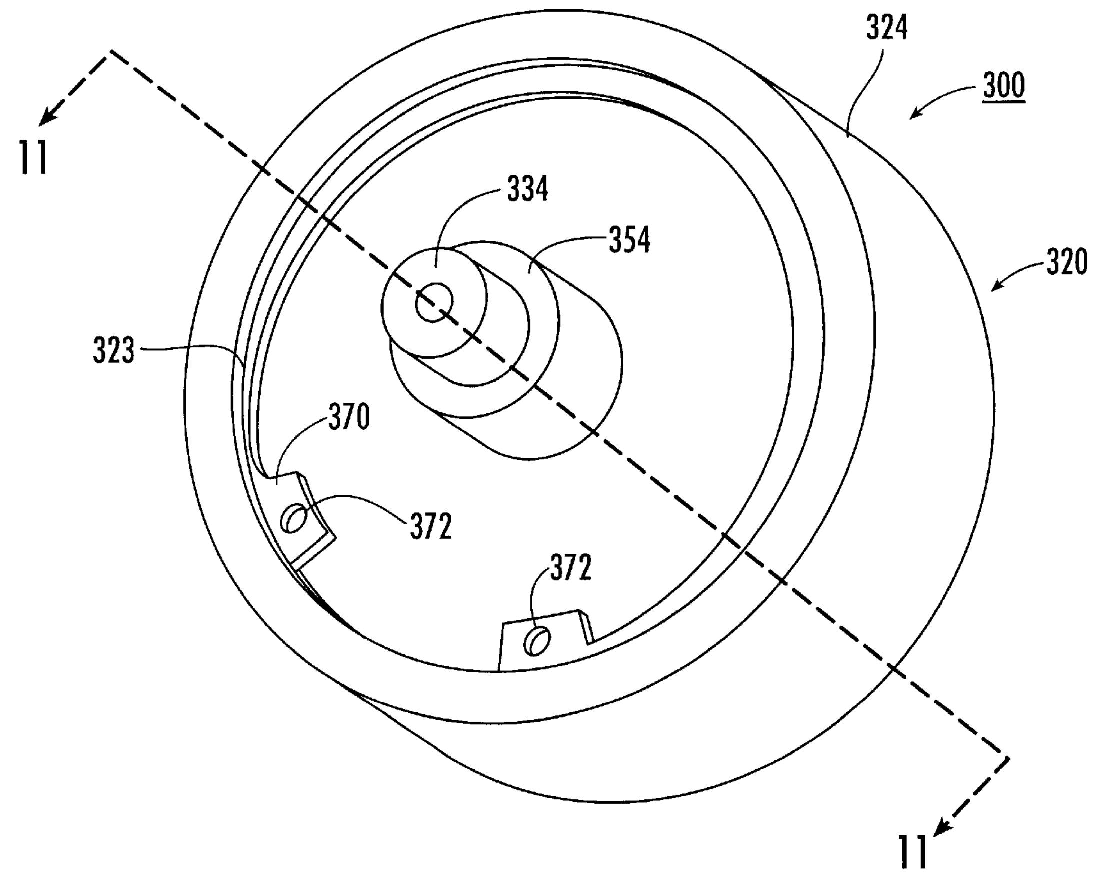
FIG. 10 is a top, perspective view of the varistor device of FIG. 9.
Figure 11:
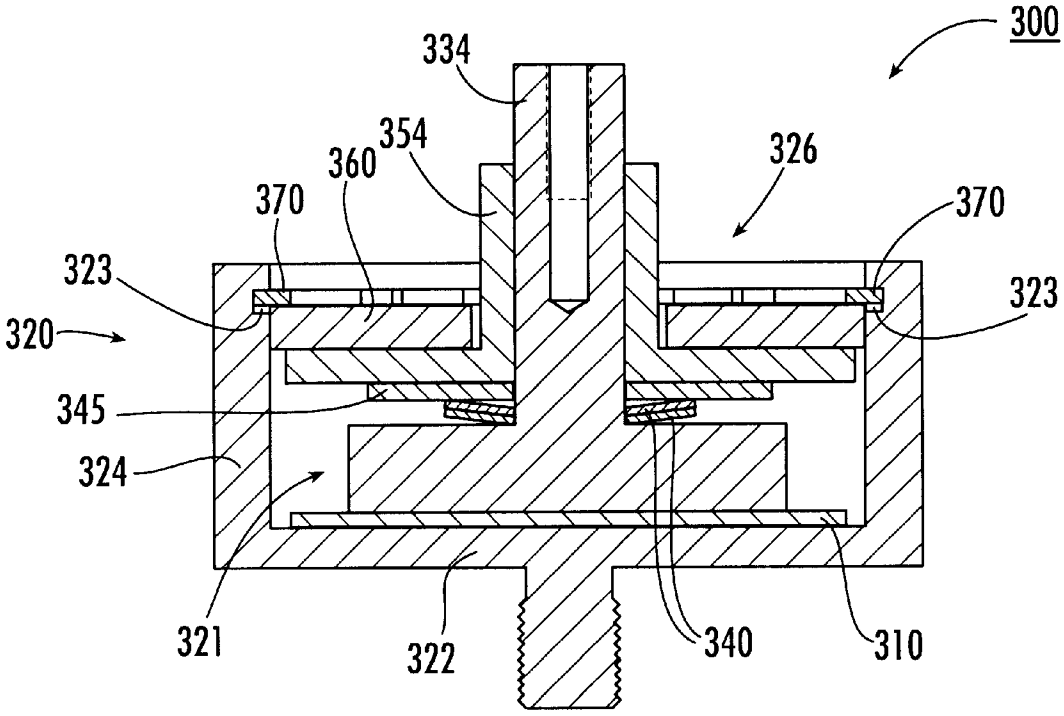
FIG. 11 is a cross-sectional view of the varistor device of FIG. 9 taken along the line 11—11 of FIG. 10.

With reference to FIGS. 9–11, a varistor device 300 according to a third embodiment of the present invention is shown therein. The varistor device 300 includes elements 310, 330, 340 and 351 corresponding to elements 210, 230, 240 and 251, respectively. The varistor device 300 also includes a flat metal washer 345 interposed between the uppermost spring washer 340 and the insulator ring 351, the shaft 334 extending through a hole 346 formed in the washer 345. The washer 345, which may be incorporated into the devices 100, 200, serves to distribute the mechanical load of the uppermost spring washer 340 to prevent the spring washer from cutting into the insulator ring 351. The housing 320 is the same as the housing 220 except as follows.

The housing 320 of device 300 does not have a rim corresponding to the rim 127 or threads corresponding to the threads 128. Also, the housing 320 has an internal annular slot 323 formed in the surrounding sidewall 324 and extending adjacent the opening 326 thereof.

The varistor device 300 also differs from the varistor devices 100, 200 in the manner in which the electrode 330 and the center wall 322 are loaded against the varistor wafer 310. In place of the end caps 160, 260, the varistor device 300 has an end cap 360 and a resilient, truncated ring shaped clip 370. The clip 370 is partly received in the slot 323 and partly extends radially inwardly from the inner wall of the housing 320 to limit outward displacement of the end cap 360. The clip 370 is preferably formed of spring steel. The end cap 360 is preferably formed of aluminum.

The varistor device 300 may be assembled in the same manner as the varistor devices 100, 200 except as follows. The end cap 360 is placed over the shaft 334 and the collar 354, each of which is received in a hole 362. The washer 345 is placed over the shaft 334 prior to placing the insulator ring 351. A jig (not shown) or other suitable device is used to force the end cap 360 down, in turn deflecting the spring washers 340. While the end cap 360 is still under the load of the jig, the clip 370 is compressed, preferably by engaging apertures 372 with pliers or another suitable tool, and inserted into the slot 323. The clip 370 is then released and allowed to return to its original diameter, whereupon it partly fills the slot and partly extends radially inward into the cavity 321 from the slot 323. The clip 370 and the slot 323 thereby serve to maintain the load on the end cap 360.

With reference to FIGS. 12–21, a varistor device 400 according to further embodiments of the present invention is shown therein. The varistor device 400 includes elements 410, 420, 422, 423, 424, 430, 440, 445, 451, 460 and 470 generally as described with reference to elements 310,320, 322, 323, 324, 330, 340, 345, 351, 360 and 370, respectively, except as discussed below. The device 400 further includes a pair of additional spring washers 441 and O-rings 480 and 482.

Figure 12:
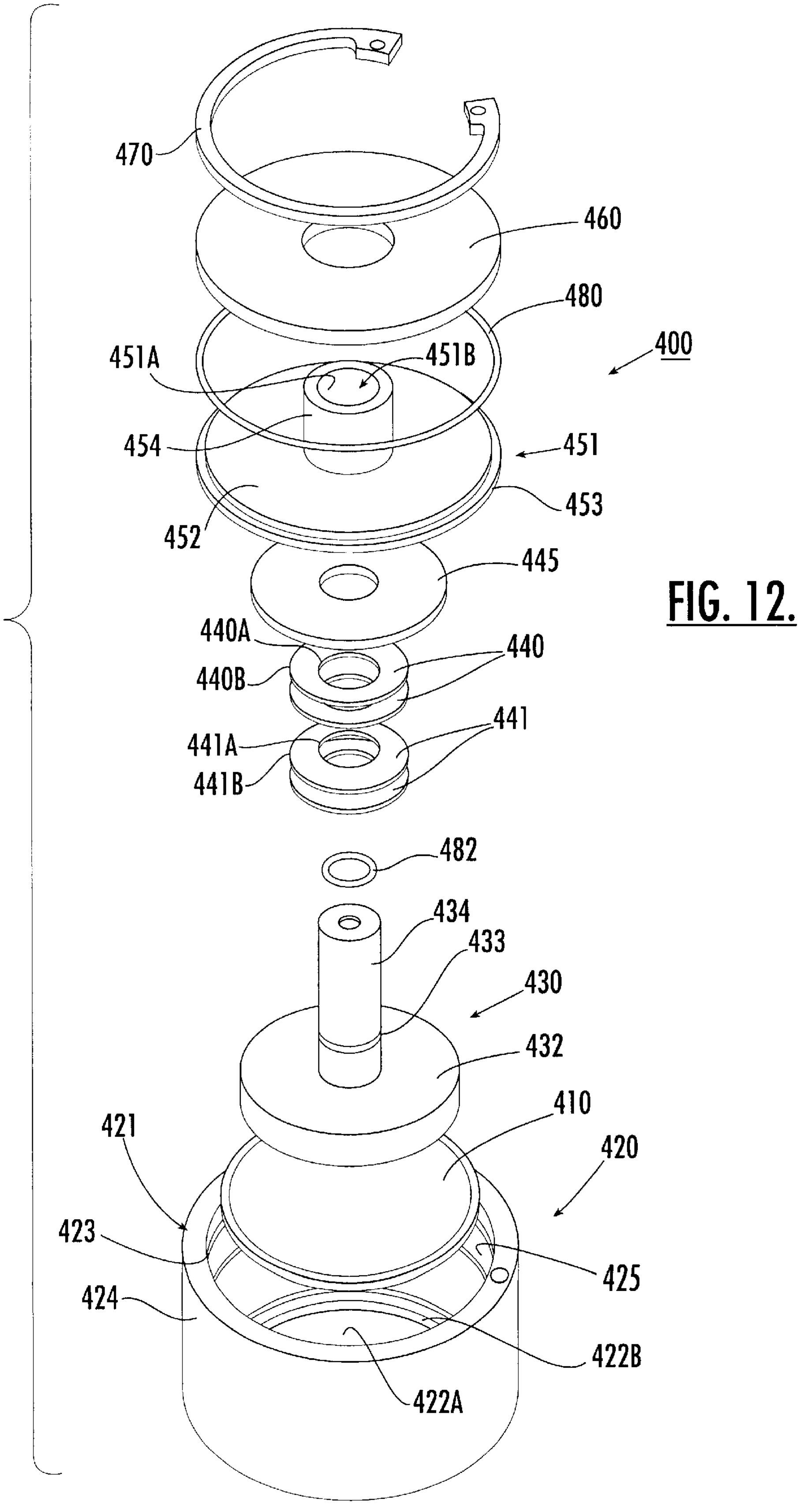
FIG. 12 is an exploded, perspective view of a varistor device according to a further embodiment of the present invention.
Figure 19:
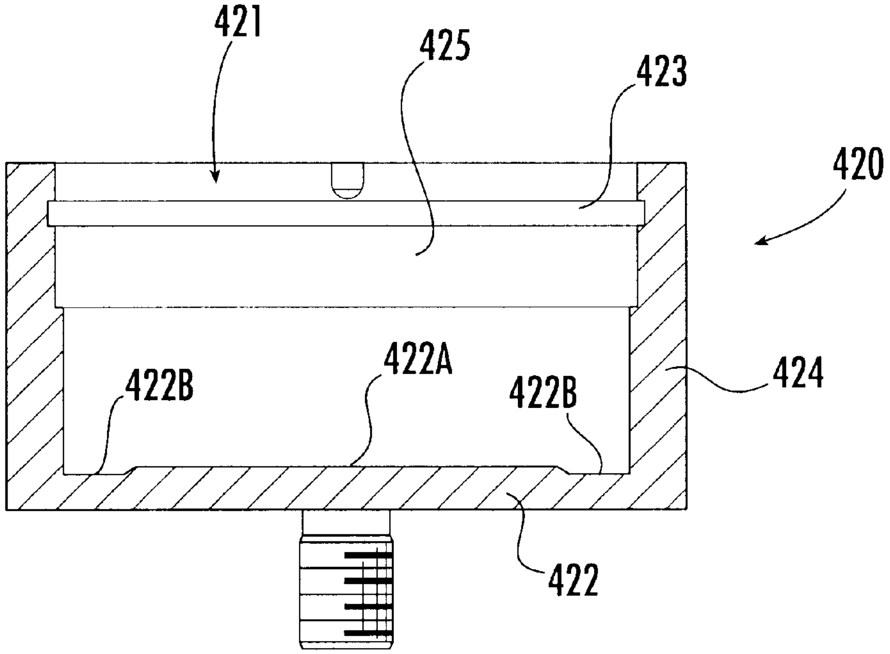
FIG. 19 is a center cross-sectional view of a housing of the varistor device of FIG. 12.

As best seen in FIGS. 12 and 19, the housing 420 defines a cavity 421 bounded by the side wall 424 and the electrode wall 422. An annular groove 425 is formed in the interior surface of the side wall 424. The groove 425 communicates with the opening of the housing 420. Preferably, the groove 425 is machined into the side wall 424 or otherwise formed so as to provide a smooth and uniform vertical surface along the full height of the groove 425. Preferably, the diameter of the groove 425 does not vary by more than 0.005 inch. The groove 425 is sized to receive the end cap 460 and the insulator ring 451 such that the end cap 460 and the insulator ring 451 are slidable therein but present a relatively small gap as discussed below.

The electrode wall 422 includes a raised platform contact surface 422A surrounded by an annular recessed surface 422B. Preferably, the recessed surface has a width R (see FIG. 13) of between about 0.427 and 0.435 inch, and a depth S of between about 0.062 and 0.070 inch.

Figure 18:
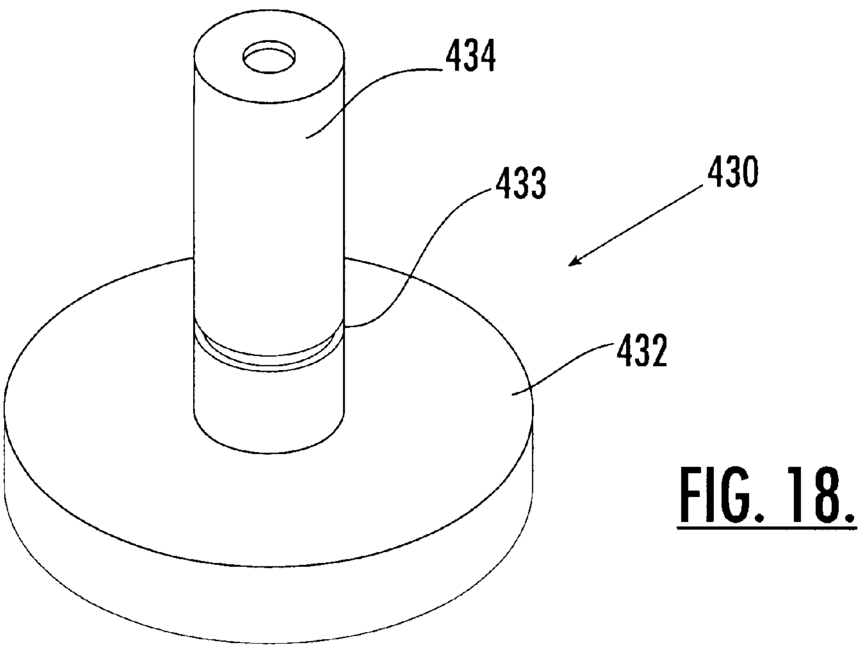
FIG. 18 is a top perspective view of an electrode of the varistor device of FIG. 12.
Figure 21:
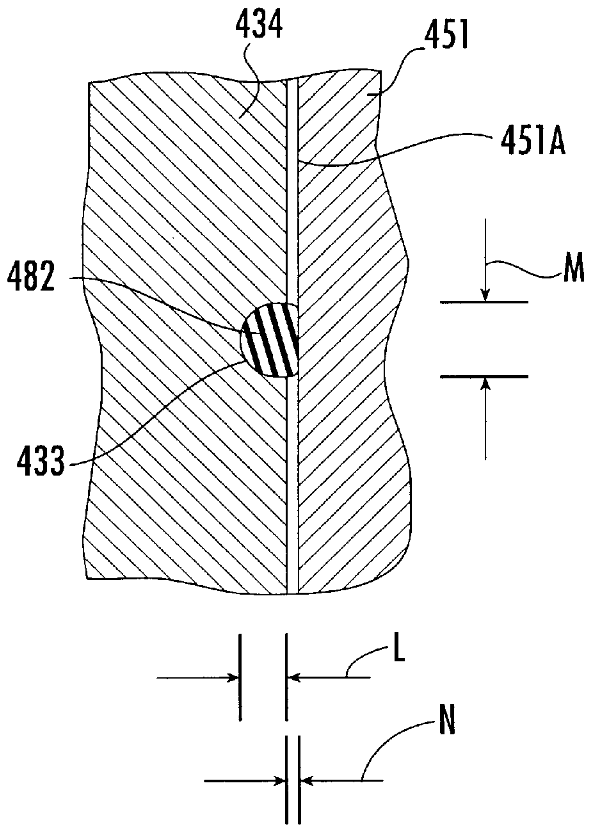
FIG. 21 is a partial, fragmentary, cross-sectional view of the varistor device of FIG. 12 showing a second O-ring thereof.

As best seen in FIGS. 18 and 21, the electrode 430 includes a head 432 and a shaft 434. An annular groove 433 is formed in the shaft 434. The groove 433 is preferably semicircular (see FIG. 21). Preferably, the groove 433 has a depth L of between about 0.045 and 0.050 inch and a height M (see FIG. 21) of between about 0.090 and 0.095 inch. The groove 433 may be molded, machined or otherwise formed in the electrode 430.

Figure 20:
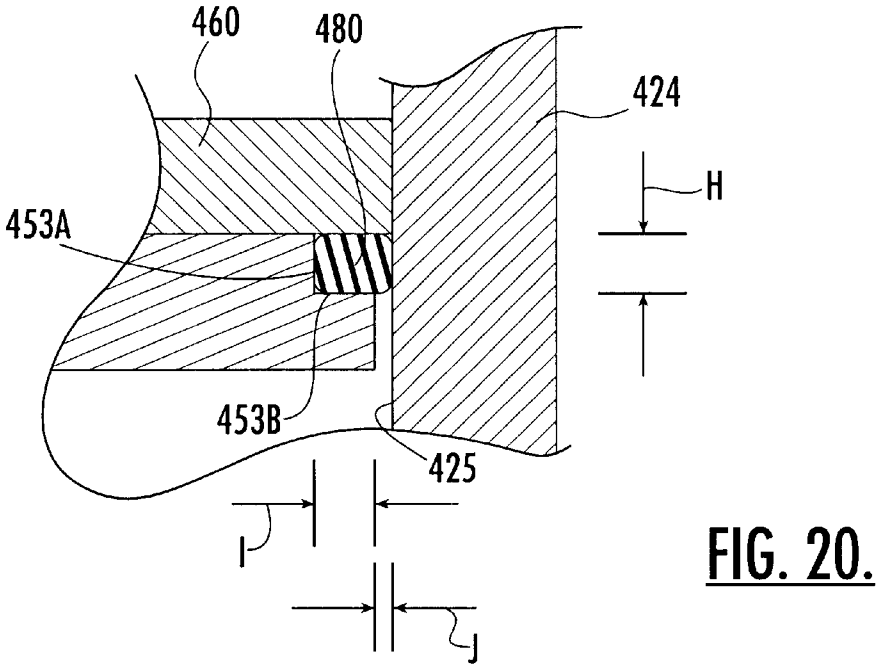
FIG. 20 is a partial, fragmentary, cross-sectional view of the varistor device of FIG. 12 showing a first ring thereof.

As best seen in FIGS. 15–17 and 20–21, the insulator ring 451 includes a main body ring 452 and a collar 454. Alternatively, the collar 454 may be omitted as in the insulator ring 150. The outer diameter of the collar 454 may be drafted to facilitate manufacture (preferably, the lower ⅜ inch is not drafted). An interior surface 451A of the ring 451 surrounds a passageway 451B (see FIG. 12) extending through the insulator ring 451. An annular, peripheral groove 453 is formed in the main body ring 452. Referring now to FIG. 20, the groove 453 has an upwardly facing (i.e., radially extending) support surface 453B and an outwardly facing (i.e., axially extending) support surface 453A so that the groove 453 opens upwardly and outwardly. The groove 453 may be molded, machined or otherwise formed in the body ring 452. Preferably, the support surface 453A has a height H of between about 0.079 and 0.081 inch, and the support surface 453B has a depth I of between about 0.066 and 0.068 inch.

Figure 13:
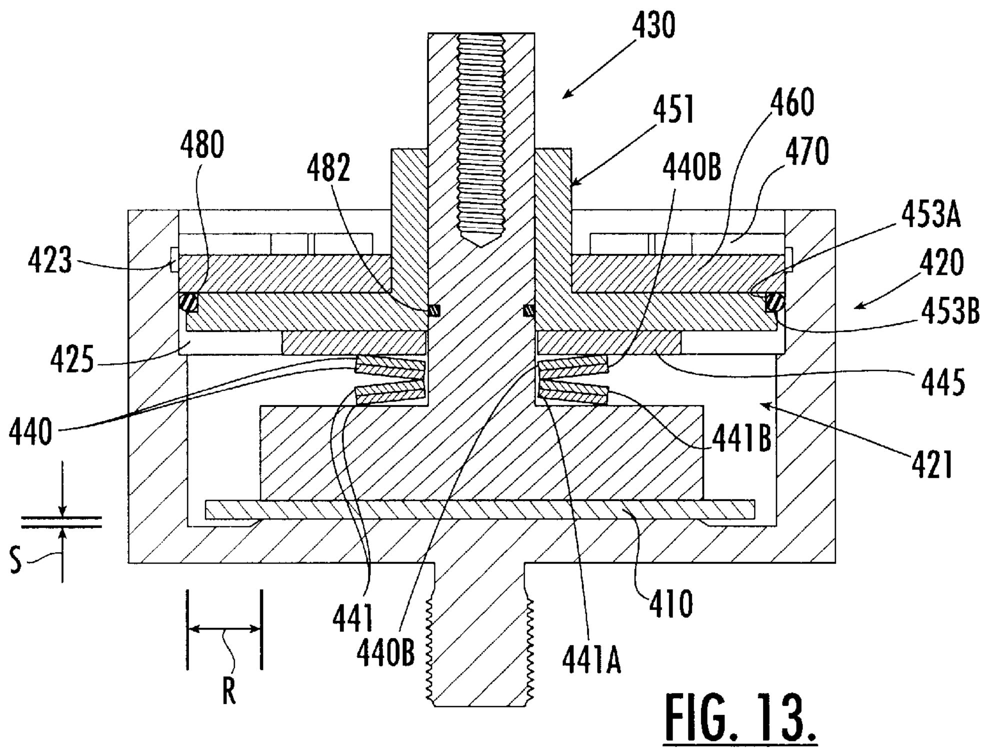
FIG. 13 is a center cross-sectional view of the varistor device of FIG. 12, wherein the varistor device is in a relaxed, partly assembled position.
Figure 14:
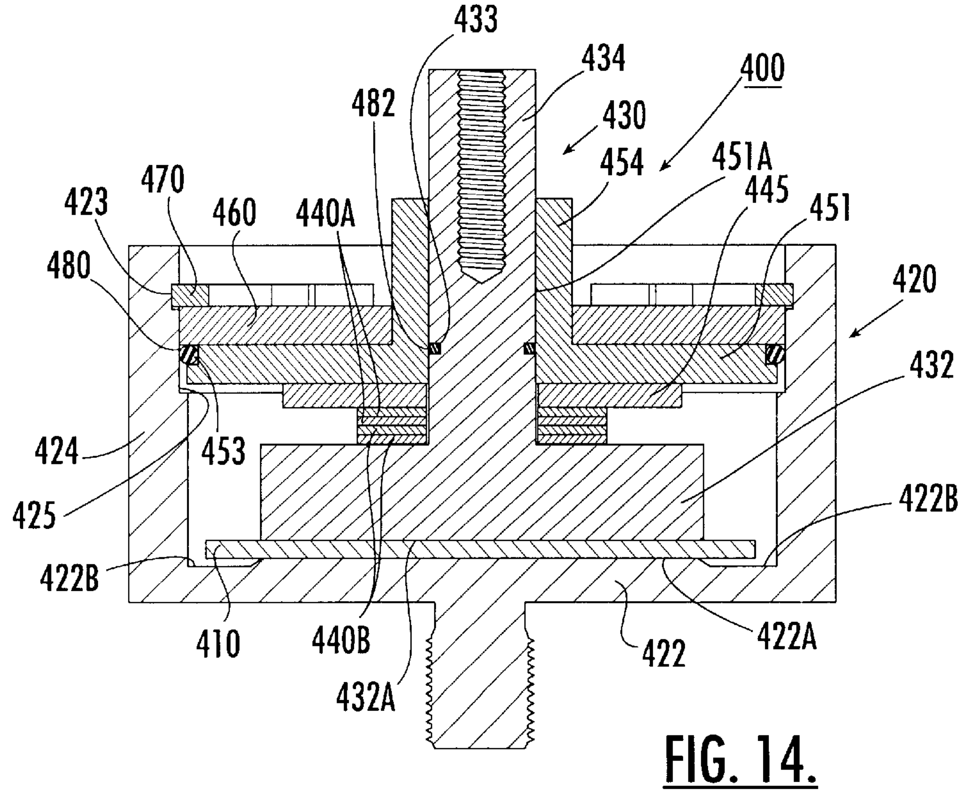
FIG. 14 is a center cross-sectional view of the varistor device of FIG. 12 in a loaded, fully assembled position.
Figure 15:
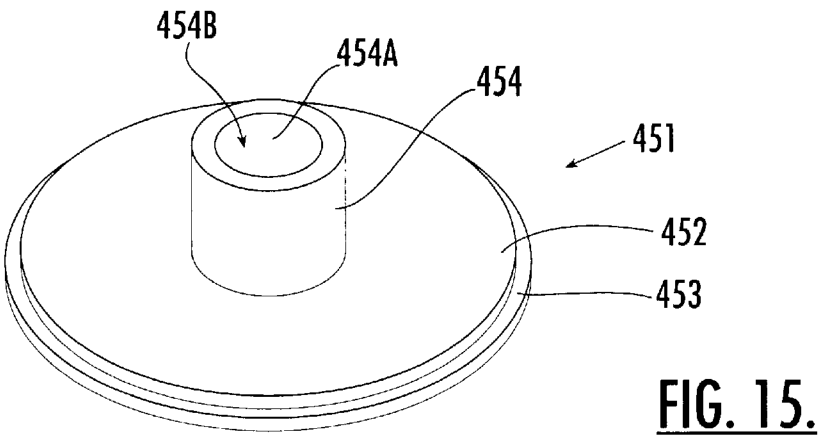
FIG. 15 is a top, perspective view of an insulator ring of the varistor device of FIG. 12.
Figure 16:
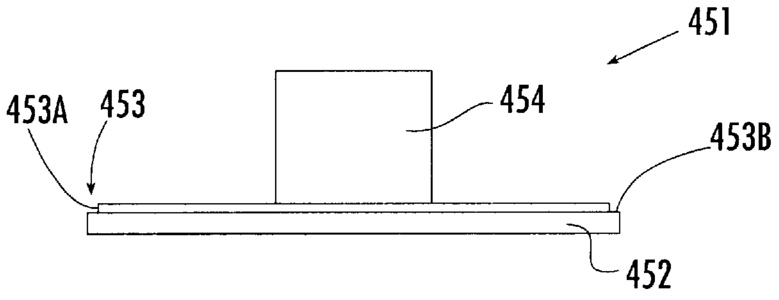
FIG. 16 is a side elevational view of the insulator ring of FIG. 15.
Figure 17:
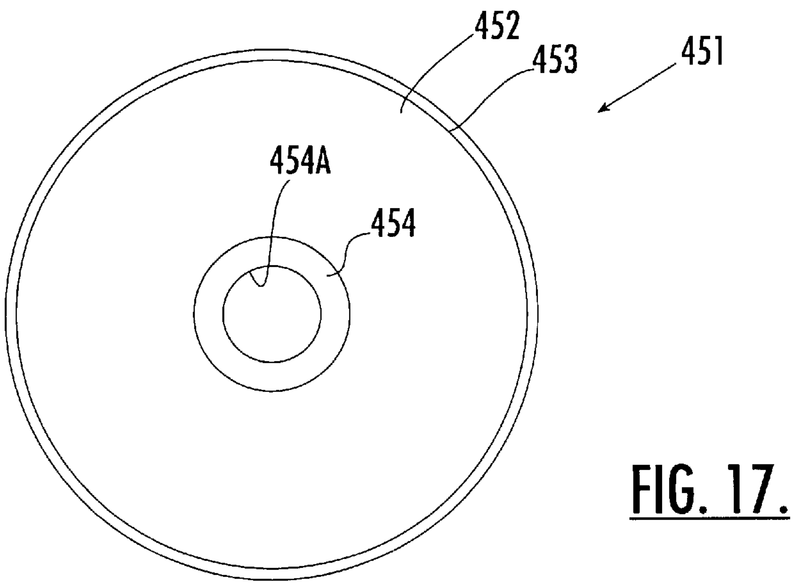
FIG. 17 is a top plan view of the insulator ring of FIG. 15.

As best seen in FIGS. 13, 14 and 20, the O-ring 480 is positioned in the groove 453 such that it is captured between the support surface 453A, the support surface 453B, the lower surface of the end cap 460, and the vertical face of the groove 425 of the housing 420. The O-ring is formed of a resilient material, preferably an elastomer. More preferably, the O-ring is formed of rubber. Most preferably, the O-ring is formed of a flourocarbon rubber such as VITON™ available from DuPont. Other rubbers such as butyl rubber may also be used. Preferably, the rubber has a durometer of between about 60 and 90.

Preferably, the O-ring 480 when relaxed (i.e., nonloaded) has a circular cross-sectional shape and a diameter of between about 0.100 and 0.105 inch. As best seen in FIG. 20, the distance between the lower face of the end cap 460 and the support surface 453B (i.e., the height H) is less than the relaxed diameter of the O-ring 480. As a result, the O-ring 480 is deformed and, being limited by the support surface 453A, forced outwardly and into engagement with the surface of the groove 425. Preferably, the gap J between the peripheral edge of the support surface 453B and the vertical surface of the groove 425 is sufficiently small that the O-ring 480 is compressed. The gap J is preferably no more than 0.024 inch.

As best seen in FIGS. 13, 14 and 21, the O-ring 482 is positioned in the groove 433 such that it is captured between the groove 433 and the interior surface 451A. The O-ring 482 is preferably formed of the same material having the same properties as described above for the O-ring 480.

Preferably, the O-ring 482 when relaxed (i.e., nonloaded) has a circular cross-sectional shape and a diameter of between about 0.065 and 0.075 inch. As best seen in FIG. 21, the depth L of the groove 433 is less than the relaxed diameter of the O-ring 482. Furthermore, the combined distance of the depth L and the gap N between the electrode shaft 434 and the interior surface 451A is less than the relaxed cross-sectional diameter of the O-ring 482 so that the O-ring 482 is compressed. The gap N is preferably no more than 0.005 inch.

With reference to FIGS. 13 and 14, the varistor device 400 may be assembled in the same manner as the device 300 except as follows. Notably, each spring washer 440, 441 in the illustrated embodiments is a Belleville washer which tapers along a center axis thereof. Before or after the electrode 430 is placed over the wafer 410, the first set of spring washers 441 is placed over the head 432. The spring washers 441 are oriented such that their outer peripheries 441B are disposed adjacent or engage the upper surface of the head 432 and their inner peripheries 441A are spaced from the head 432. The second set of spring washers 440 is then placed over the spring washers 441. The spring washers 440 are oriented such that their inner peripheries 440A are disposed adjacent or engage the inner periphery 441A of the topmost spring washer 441 and their outer peripheries 440B are disposed adjacent or engage the lower surface of the washer 445. Accordingly, the center axes of the spring washers 440, 441 are aligned with one another along the vertical axis of the device 400, but the washers 440 are oppositely oriented. That is, the washers 440 taper downwardly and the washers 441 taper upwardly.

Prior to positioning the insulator ring 451 over the electrode 430, the O-ring 482 is mounted in the groove 433. Preferably, the insulator ring 451 is placed over the electrode 430 and over the O-ring 482 (such that the O-ring 482 is captured as shown in FIG. 21) prior to installing the electrode 430 in the cavity 421.

The O-ring 480 is mounted in the groove 453, preferably prior to inserting the insulator ring 451 into the housing 420. The end cap 460 is then placed over the O-ring 480 and the insulator ring 451, also preferably prior to inserting the insulator ring 451 into the housing 420.

After the several components are assembled as shown in FIG. 13, the end cap 460 is forced downwardly as discussed with regard to the varistor device 300. In this manner, the end cap 460, the insulator ring 451, the washer 445 and the O-ring 480 are displaced downwardly, causing the spring washers 440,441 to deflect and load the head 432. The relative arrangement of the spring washers 440, 441 as described above may allow for twice as much vertical deflection (and, therefore, vertical displacement between the washer 445 and the head 432) with the same amount of spring force as if only the two spring washers 440 or the two spring washers 441 were provided. This increased amount of deflection may allow for more lenient manufacturing tolerances of the components in the stack (e.g., elements 410, 422, 432, 445, 454 and 460), thereby facilitating manufacture of the varistor device 400. Thereafter, the snap ring or clip 470 is installed as described above with regard to the clip 370.

As the wafer 410 is loaded between the head 432 and the platform 422A, the electrode coatings on the opposed faces of the wafer 410 are crushed. The recessed surface 422B ensures that the boundary of the electrode coating is disposed outside of the platform 422, which may reduce or eliminate any tendency for bending stresses to be applied to the wafer 410. Preferably, the periphery of the platform 422A is substantially coextensive with the periphery of the contact surface of the head 432.

As discussed above, the O-ring 482 is captured and compressed by the groove 433 and the surface 451A. In this manner, the O-ring 482 is biased against the surface 451 and the shaft 434 and thereby forms a seal therebetween. In an overvoltage event, byproducts such as hot gases and fragments from the wafer 410 may fill or scatter into the cavity 421. These byproducts may be limited or prevented by the O-ring 482 from escaping the varistor device 400 along a path between the shaft 434 and the insulator ring 451.

Alternatively (not shown), the O-ring 482 may engage the inner surface of the end cap 460. This arrangement may be employed if, for example, the insulating ring 451 is omitted.

As discussed above, the O-ring 480 is captured and compressed by the groove 453, the lower surface of the end cap 460 and the groove surface 425. In this manner, the 0ring 480 is biased against the groove surface 425, the end cap 460 and the insulator ring 451 and thereby forms a seal therebetween. Byproducts from an overvoltage event may be limited or prevented by the O-ring 480 from escaping the varistor device 400 along a path between the groove surface 425 and the insulator ring 451 and the end cap 460. The machined or otherwise smoothed surface of the groove 425 may ensure a consistent and effective sealing engagement with the O-ring 480.

Figure 22:
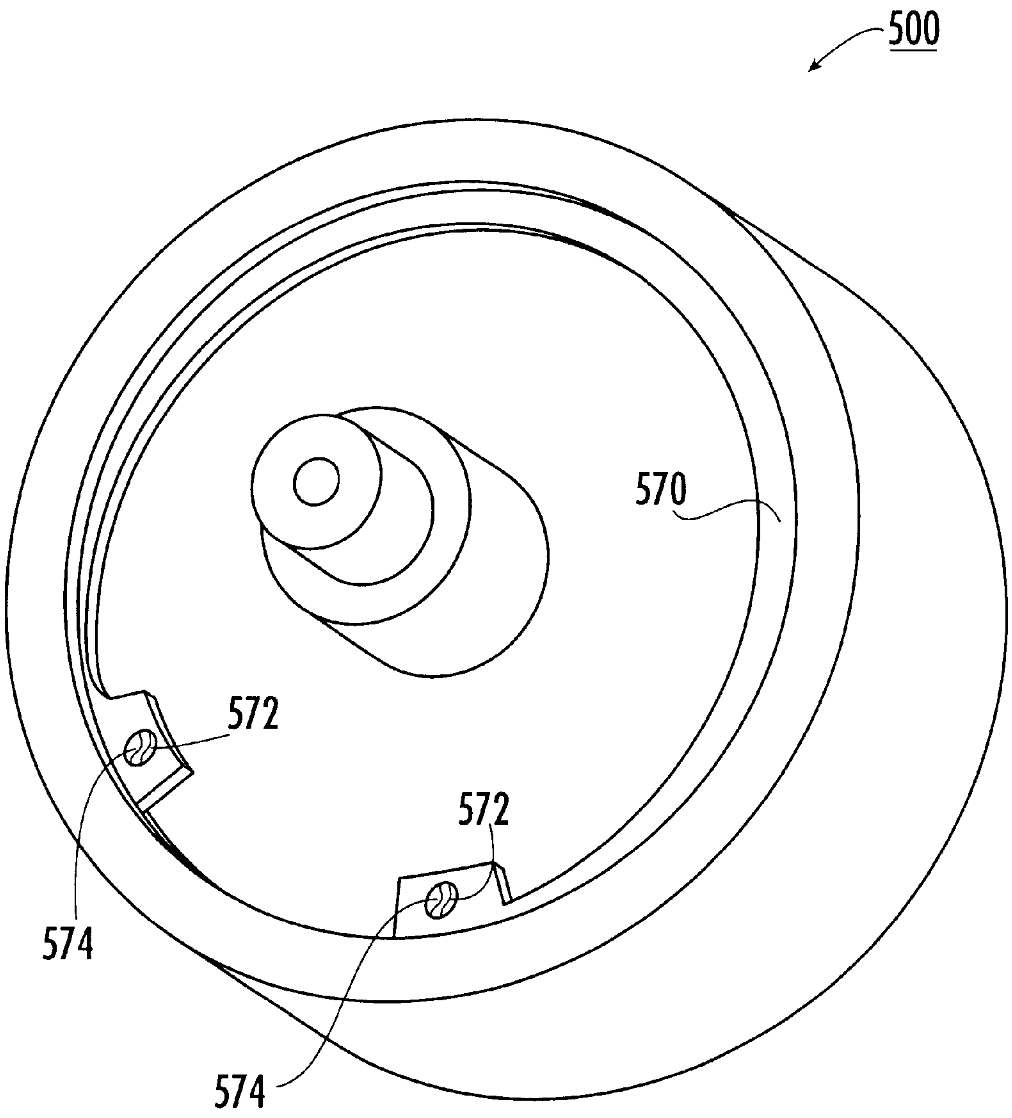
FIG. 22 is a top, perspective view of a varistor device according to a further embodiment of the present invention.

With reference to FIG. 22, a varistor device 500 according to further embodiments of the present invention is shown therein. The varistor device 500 may correspond to any of the foregoing varistor devices 300, 400 or the like including a clip for securing the end cap thereof. The device 500 includes a snap ring or clip 570 corresponding to the clips 370, 470 and has apertures 572 for receiving pliers or other suitable compressing tools. The clip 570 may be installed in the manner described above.

Following installation, a suitable filler material 574 such as an epoxy resin (for example, JB Weld™ epoxy resin) is deposited in each of the apertures 572. In order to open the device 500 once closed, the clip 570 must be recompressed or destroyed, and removed. In order to recompress the clip 570, the filler material 574 must be partially or fully removed. In this manner, the filler material 574 inhibits opening of the device 500 and, in the event the device 500 is opened, provides a tamper evident feature by ensuring that evidence of the opening of the device 500 (i.e., the destruction of the clip 570 or the filler material 574) is readily visible during later inspection.

Figure 23:
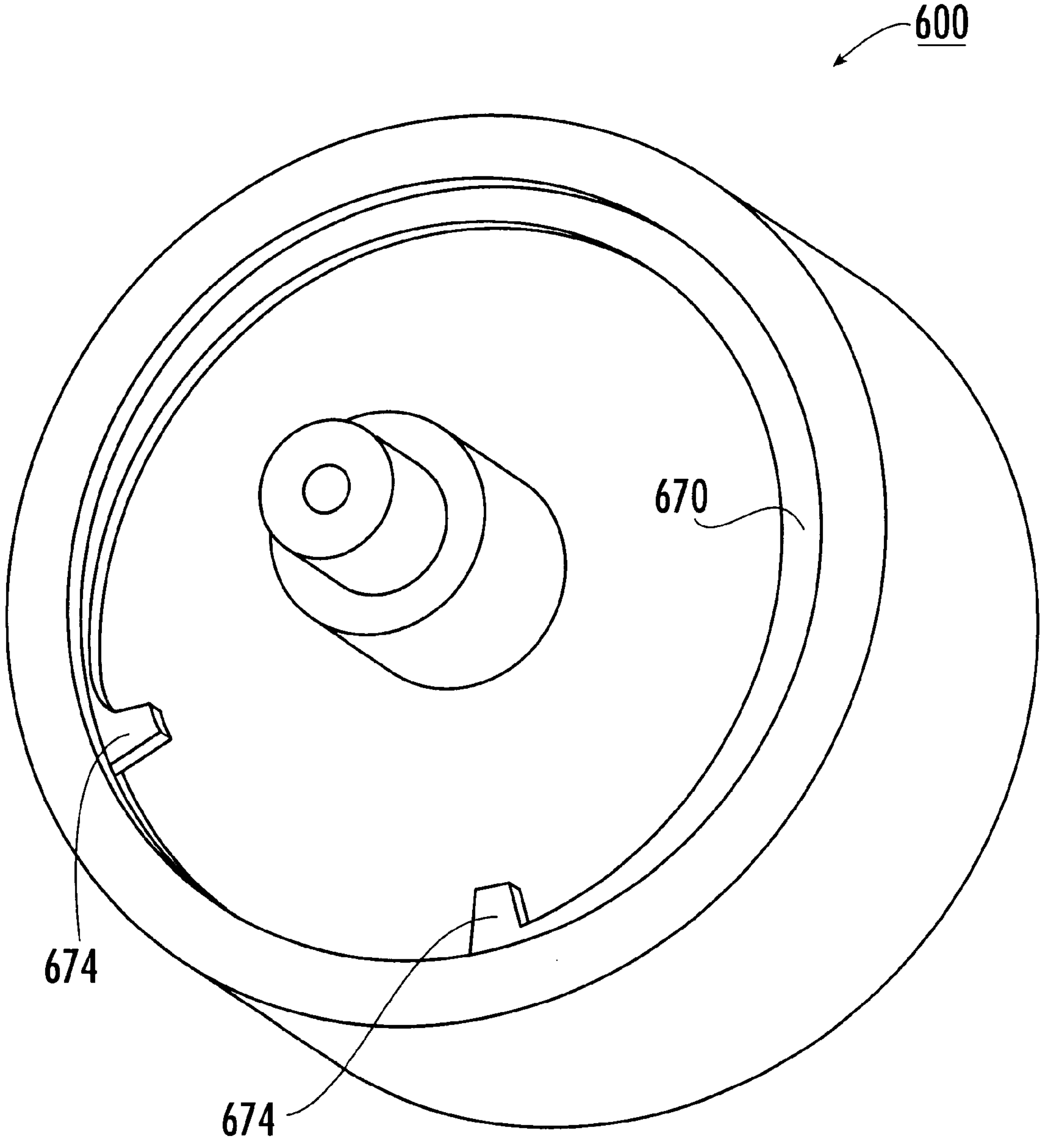
FIG. 23 is a top, perspective view of a varistor device according to a further embodiment of the present invention.

With reference to FIG. 23, a varistor device 600 according to further embodiments of the present invention is shown therein. The varistor device 600 may correspond to any of the foregoing varistor devices 300, 400 or the like including a clip for securing the end cap thereof. The device 600 includes a snap ring or clip 670. Initially, the clip 670 corresponds to the clip 370 (see FIG. 10), for example, and has apertures corresponding to the apertures 372. These apertures are used to receive the pliers or other compressing tool to install the clip in the groove as described with regard to the device 300.

Following installation, the ends of the clip are cut to remove the portions thereof including the apertures. The ends of the clip may be cut in situ using a chisel, drill, high speed rotary tool (eg., a DREMEL™ tool) or the like. In this manner, the clip 670 is formed having abbreviated end portions 674. The removal of the apertures may preclude recompression of the clip 670, so that the clip 670 must be destroyed to be removed. In this manner, the clip 670 inhibits opening of the device 600 and, in the event the device 600 is opened, may provide a tamper evident feature by ensuring that evidence of the opening of the device 600 is readily visible during later inspection.

Figure 24:
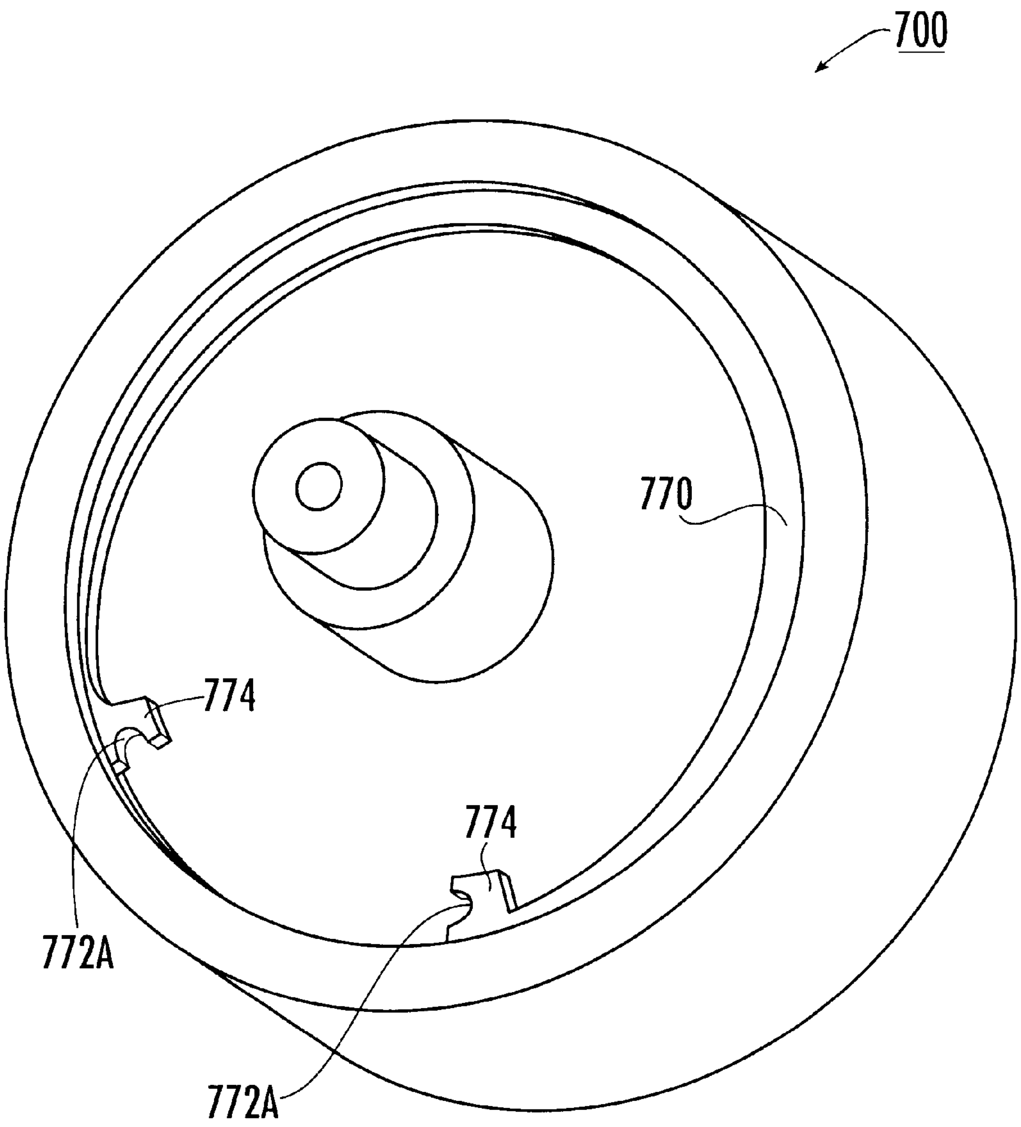
FIG. 24 is a top, perspective view of a varistor device according to a further embodiment of the present invention.

With reference to FIG. 24, a varistor device 700 according to further embodiments of the present invention is shown therein. The varistor device 700 corresponds to the varistor device 600 except that less of the ends of the clip 770 are cut off. Rather, a portion 772A of each aperture is left on each abbreviated end 774. In a manner similar to that of the clip 670, the clip 770 may inhibit opening of the device 700 and provide tamper evidence.

Means other than those described above may be used to load the electrode and housing against the varistor wafer. For example, the electrode and end cap may be assembled and loaded, and thereafter secured in place using a staked joint.

In each of the aforedescribed varistor devices, (e.g., the devices 100, 200, 300, 400, 500, 600 and 700) multiple varistor wafers (not shown) may be stacked and sandwiched between the electrode head and the center wall. The outer surfaces of the uppermost and lowermost varistor wafers would serve as the wafer contact surfaces. However, the properties of the varistor wafer are preferably modified by changing the thickness of a single varistor wafer rather than stacking a plurality of varistor wafers.

As discussed above, the spring washers (e.g., the spring washers 140, 440 and 441) are preferably Belleville washers. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the Claims. In the Claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended Claims. The invention is defined by the following Claims, with equivalents of the Claims to be included therein.

What is claimed is:

1. An overvoltage protection device comprising:

a) a housing including a first substantially planar electrical contact surface and an electrically conductive sidewall, said housing defining a cavity therein and having an opening in communication with said cavity;

b) an electrode member including a second substantially planar electrical contact surface facing said first electrical contact surface and disposed within said cavity, a portion of said electrode member extending out of said cavity and through said opening; and c) a wafer formed of varistor material and having first and second opposed, substantially planar wafer surfaces, said wafer positioned within said cavity and between said first and second electrical contact surfaces with said first and second wafer surfaces engaging said first and second electrical contact surfaces, respectively.

2. The device of claim 1 including an electrically insulating member interposed between said second electrical contact surface and said opening.

3. The device of claim 1 including an end cap positioned in said opening and having a hole formed therein, wherein said electrode member includes a head positioned in said cavity between said end cap and said first contact surface and a shaft extending out of said cavity and through said end cap hole.

4. The device of claim 3 including an electrically insulating ring member having a hole formed therein, said insulating ring member interposed between said head and said end cap, wherein said shaft extends through said insulating ring member hole.

5. The device of claim 3 including a spring washer having a hole formed therein, said spring washer interposed between said head and said end cap, wherein said shaft extends through said spring washer hole.

6. The device of claim 3 including an electrically insulating ring member and a spring washer, said electrically insulating ring member having a hole formed therein and interposed between head and said end cap, said spring washer having a hole formed therein and interposed between head and said electrically insulating ring member, wherein said shaft extends through each of said electrically insulating ring member hole and said spring washer hole.

7. The device of claim 1 wherein said housing and said electrode member have a combined thermal mass which is substantially greater than a thermal mass of said wafer.

8. The device of claim 1 wherein said housing is formed of metal.

9. The device of claim 1 wherein said wafer is formed by slicing a rod of varistor material.

10. The device of claim 9 wherein said rod is formed by at least one of extruding and casting.

11. The device of claim 9 wherein said varistor material is selected from the group consisting of a metal oxide compound and silicon carbide.

12. The device of claim 9 wherein said wafer includes a coating of conductive metal on at least one of said first and second wafer surfaces.

13. The device of claim 9 wherein said wafer has a substantially circular peripheral edge and each of said first and second disk surfaces are substantially coextensive with said circular peripheral edge.

14. The device of claim 1 wherein each of said first and second contact surfaces is continuous and substantially free of voids.

15. An overvoltage protection device for use with a varistor wafer of the type having first and second opposed, substantially planar wafer surfaces, said device comprising:

a) a housing including a first substantially planar electrical contact surface and an electrically conductive sidewall, said housing defining a cavity therein and having an opening in communication with said cavity; and b) an electrode member including a second substantially planar electrical contact surface facing said first contact surface and disposed within said cavity, a portion of said electrode extending out of said cavity and through said opening;

c) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively.

16. An overvoltage protection device for use with a varistor wafer of the type having first and second opposed, substantially planar wafer surfaces, said device comprising:

a) a housing defining a cavity therein and having an opening in communication with said cavity, said housing including:

a sidewall; and a bottom wall including a first substantially planar electrical contact surface and an adjacent recessed surface, said first electrical contact surface defining a raised platform relative to said recessed surface; and b) an electrode member including a second substantially planar electrical contact surface facing said first contact surface and disposed within said cavity, a portion of said electrode extending out of said cavity and through said opening;

c) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively, and such that the wafer does not engage said recessed surface.

17. The device of claim 16 wherein said recessed surface substantially completely surrounds said second electrical contact surface.

18. The device of claim 16 further comprising the varistor wafer positioned in the housing between the first and second electrical contact surfaces.

19. An overvoltage protection device for use with a varistor wafer of the type having first and second opposed, substantially planar wafer surfaces, said device comprising:

a) a housing including a first substantially planar electrical contact surface and a sidewall, said housing defining a cavity therein and having an opening in communication with said cavity;

b) an electrode member including:

a second substantially planar electrical contact surface facing said first contact surface and disposed within said cavity; and a shaft extending out of said cavity and through said opening, said shaft including a circumferential shaft groove formed therein;

c) a closure member interposed between said second electrical contact surface and said opening, said closure member having a hole defined therein; and d) a resilient O-ring disposed in said shaft groove;

e) wherein said shaft extends through said aperture, said O-ring is disposed in said hole and said O-ring is positioned to provide a seal between said shaft and said closure member;

f) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively.

20. The device of claim 19 wherein said O-ring is compressed.

21. The device of claim 19 wherein said O-ring is formed of an elastomeric material.

22. The device of claim 19 wherein said closure member includes an electrically insulating member.

23. The device of claim 19 wherein said closure member includes an end cap.

24. The device of claim 19 further comprising the varistor wafer positioned in the housing between the first and second electrical contact surfaces.

25. An overvoltage protection device for use with a varistor wafer of the type having first and second opposed, substantially planar wafer surfaces, said device comprising:

a) a housing including a first substantially planar electrical contact surface and a sidewall, said housing defining a cavity therein and having an opening in communication with said cavity;

b) an electrode member including a second substantially planar electrical contact surface facing said first contact surface and disposed within said cavity, a portion of said electrode extending out of said cavity and through said opening;

c) a closure member interposed between said second electrical contact surface and said opening, said closure member having a peripheral groove formed therein; and d) a resilient O-ring disposed in said peripheral groove;

e) wherein said O-ring is positioned to provide a seal between said closure member and said sidewall of said housing;

f) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively.

26. The device of claim 25 wherein said O-ring is compressed.

27. The device of claim 25 wherein said O-ring is formed of an elastomeric material.

28. The device of claim 25 wherein said closure member includes an electrically insulating member.

29. The device of claim 28 further including an end cap positioned in said opening adjacent said insulating member and engaging said O-ring.

30. The device of claim 29 wherein said groove includes a radially extending wall and an axially extending wall and said O-ring engages each of said radially extending wall, said axially extending wall, said sidewall and said end cap.

31. The device of claim 25 further comprising the varistor wafer positioned in the housing between the first and second electrical contact surfaces.

32. An overvoltage protection device for use with a varistor wafer of the type having first and second opposed, substantially planar wafer surfaces, said device comprising:

a) housing including a first substantially planar electrical contact surface and a sidewall, said housing defining a cavity therein and having an opening in communication with said cavity;

b) an electrode member including a second substantially planar electrical contact surface facing said first contact surface and disposed within said cavity, a portion of said electrode extending out of said cavity and through said opening;

c) an end cap positioned in said opening; and d) a clip positioned to limit displacement between said end cap and said housing;

e) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively.

33. The device of claim 32 wherein said clip is truncated ring-shaped and includes:

a pair of opposed end portions;

an aperture defined in each of said opposed end portions; and filler material disposed in each of said apertures.

34. The device of claim 32 wherein said clip is truncated ring-shaped and includes:

a pair of opposed end portions; and a pair of open recesses, each of said open recesses formed in a respective one of said opposed end portions and generally facing the other of said opposed end portions.

35. The device of claim 32 wherein said clip is truncated ring-shaped and includes a pair of opposed end portions, wherein each of said opposed end portions is free of apertures.

36. The device of claim 32 further comprising the varistor wafer positioned in the housing between the first and second electrical contact surfaces.

37. An overvoltage protection device for use with a varistor wafer of the type having first and second opposed, substantially planar wafer surfaces, said device comprising:

a) a housing including a first substantially planar electrical contact surface and a sidewall, said housing defining a cavity therein and having an opening in communication with said cavity;

b) an electrode member including a second substantially planar electrical contact surface facing said first contact surface and disposed within said cavity, a portion of said electrode extending out of said cavity and through said opening; and c) first and second Belleville washers biasing at least one of said first and second contact surfaces toward the other, each of said washers being tapered along an axis thereof;

d) wherein said first and second Belleville washers are axially aligned and oppositely oriented;

e) wherein said housing and said electrode member are relatively arranged and configured to receive the wafer within said cavity such that the wafer is positioned between said first and second electrical contact surfaces with said first and second electrical contact surfaces engaging the first and second wafer surfaces, respectively.

38. The device of claim 37 further comprising the varistor wafer positioned in the housing between the first and second electrical contact surfaces.

* * * * *